(12) United States Patent
Volkerink et al.

(10) Patent No.: US 12,490,341 B2
(45) Date of Patent: Dec. 2, 2025

(54) SYSTEM AND METHOD OF GENERATING ENVIRONMENTAL PROFILES FOR DETERMINING LOGISTICS OF ASSETS

(71) Applicant: TRACKONOMY SYSTEMS, INC., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 435 days.

(21) Appl. No.: 17/449,876

(22) Filed: Oct. 4, 2021

(65) Prior Publication Data

US 2022/0110189 A1 Apr. 7, 2022

Related U.S. Application Data

(60) Provisional application No. 63/087,303, filed on Oct. 5, 2020, provisional application No. 63/087,205, filed on Oct. 3, 2020.

(51) Int. Cl.
*H04W 4/00* (2018.01)
*H04W 4/80* (2018.01)
(Continued)

(52) U.S. Cl.
CPC ............ *H04W 84/18* (2013.01); *H04W 4/80* (2018.02); *H04W 72/20* (2023.01); *H04W 76/20* (2018.02)

(58) Field of Classification Search
CPC ....... H04W 84/18; H04W 4/80; H04W 72/20; H04W 76/20; H04W 4/029; H04W 4/35;
(Continued)

(56) References Cited

U.S. PATENT DOCUMENTS 5,478,991 A 12/1995 Watanabe
5,495,250 A 2/1996 Ghaem
(Continued)

FOREIGN PATENT DOCUMENTS

AU 2018204317 A1 1/2019
CA 3008512 A1 12/2018
(Continued)

OTHER PUBLICATIONS

PCT Application No. PCT/US2018/064919, Written Opinion, dated Apr. 5, 2019, 7 pages.
(Continued)

*Primary Examiner* — Sithu Ko
*Assistant Examiner* — Hidayat Dabiri

(57) ABSTRACT

A wireless sensing system, comprising at least one tape node, each tape node adhered to a respective asset, comprising at least one sensor, the at least one tape node having a first processor, a first memory communicatively coupled with the first processor, the first memory storing machine-readable instructions that, when executed by the first processor, cause the first processor to: capture, by the at least one sensor of the at least one tape node, environmental data; generate, based on the captured environmental data, at least one environmental profile; determine, based on comparing the environmental profile to an accepted environmental profile, that a difference between the environmental profile and an accepted environmental profile satisfies a predetermined threshold; and responsive to the difference satisfying the threshold, generate a notification that includes instructions to perform an action.

19 Claims, 20 Drawing Sheets

(51) Int. Cl.
*H04W 72/20* (2023.01)
*H04W 76/20* (2018.01)
*H04W 84/18* (2009.01)

(58) Field of Classification Search
CPC ........... H04W 4/38; G06N 3/006; G06N 3/04; G06K 19/0702; G06K 19/0707; G06K 19/0716; G06K 19/0723; H04L 67/125
See application file for complete search history.

(56) References Cited

U.S. PATENT DOCUMENTS

| | | |
|---|---|---|
| 5,499,717 A | 3/1996 | Hayashi |
| 5,838,253 A | 11/1998 | Wurz |
| 5,917,433 A | 6/1999 | Keillor |
| 6,372,342 B1 | 4/2002 | Karaoglu |
| 6,375,780 B1 | 4/2002 | Tuttle et al. |
| 6,404,341 B1 | 6/2002 | Reid |
| 6,614,392 B2 | 9/2003 | Howard |
| 6,919,803 B2 | 7/2005 | Breed |
| 7,009,517 B2 | 3/2006 | Wood |
| 7,020,701 B1 | 3/2006 | Gelvin et al. |
| 7,048,194 B2 | 5/2006 | Minami et al. |
| 7,177,054 B2 | 2/2007 | Silverbrook et al. |
| 7,259,030 B2 | 8/2007 | Daniels et al. |
| 7,299,990 B2 | 11/2007 | Hoshina |
| 7,321,167 B2 | 1/2008 | Zhong et al. |
| 7,405,656 B2 | 7/2008 | Olsen |
| 7,511,616 B2 | 3/2009 | Lake |
| 7,540,603 B2 | 6/2009 | Otsuki |
| 7,722,249 B2 | 5/2010 | Kim et al. |
| 7,838,844 B2 | 11/2010 | Wagner |
| 7,884,727 B2 | 2/2011 | Tran |
| 8,062,735 B2 | 11/2011 | Bi |
| 8,072,620 B2 | 12/2011 | Yamamoto et al. |
| 8,110,254 B1 | 2/2012 | Sharma |
| 8,171,791 B2 | 5/2012 | Sy et al. |
| 8,269,633 B2 | 9/2012 | Hollander et al. |
| 8,292,173 B2 | 10/2012 | Yturralde et al. |
| 8,401,238 B2 | 3/2013 | Stahlin et al. |
| 8,448,530 B2 | 5/2013 | Leuenberger et al. |
| 8,658,455 B2 | 2/2014 | Shin et al. |
| 8,716,629 B2 | 5/2014 | Klewer et al. |
| 8,786,510 B2 | 7/2014 | Coleman |
| 8,833,664 B2 | 9/2014 | Choi |
| 8,879,276 B2 | 11/2014 | Wang |
| 8,971,673 B2 | 3/2015 | Beinhocker |
| 9,015,071 B2 | 4/2015 | Breed |
| 9,070,286 B2 | 6/2015 | Moore |
| 9,137,637 B2 | 9/2015 | Bilal et al. |
| 9,159,635 B2 | 10/2015 | Elolampi et al. |
| 9,182,231 B2 | 11/2015 | Skaaksrud |
| 9,183,738 B1 | 11/2015 | Allen et al. |
| 9,189,226 B2 | 11/2015 | Driesen et al. |
| 9,372,123 B2 | 6/2016 | Li et al. |
| 9,473,902 B2 | 10/2016 | Bilal et al. |
| 9,496,582 B1 | 11/2016 | Lim et al. |
| 9,543,495 B2 | 1/2017 | Paschkewitz et al. |
| 9,543,549 B2 | 1/2017 | Bai et al. |
| 9,583,428 B2 | 2/2017 | Rafferty et al. |
| 9,632,050 B2 | 4/2017 | Zhong et al. |
| 9,643,460 B2 | 5/2017 | Peine et al. |
| 9,644,401 B2 | 5/2017 | Nguyen et al. |
| 9,753,568 B2 | 9/2017 | McMillen |
| 9,781,825 B2 | 10/2017 | Farkas et al. |
| 9,824,329 B2 | 11/2017 | Stirling et al. |
| 9,860,688 B2 | 1/2018 | Kulkami et al. |
| 10,902,310 B2 | 1/2021 | Khoche |
| 2003/0000128 A1 | 1/2003 | Wood et al. |
| 2003/0018927 A1 | 1/2003 | Gadir et al. |
| 2003/0163287 A1 | 8/2003 | Vock et al. |
| 2004/0044493 A1 | 3/2004 | Coulthard |
| 2004/0131761 A1 | 7/2004 | Shakespeare |
| 2006/0100299 A1 | 5/2006 | Malik et al. |
| 2007/0049291 A1 | 3/2007 | Kim et al. |
| 2007/0095905 A1 | 5/2007 | Kadaba |
| 2007/0287473 A1 | 12/2007 | Dupray |
| 2008/0079567 A1 | 4/2008 | Poor |
| 2008/0184795 A1 | 8/2008 | Woodard |
| 2008/0198002 A1 | 8/2008 | Bartholf et al. |
| 2008/0239282 A1 | 10/2008 | Zou et al. |
| 2009/0051530 A1 | 2/2009 | Brooks et al. |
| 2009/0072974 A1 | 3/2009 | Miyashita et al. |
| 2009/0174600 A1 | 7/2009 | Mazlum et al. |
| 2009/0192709 A1 | 7/2009 | Yonker et al. |
| 2009/0196267 A1 | 8/2009 | Walker |
| 2010/0082870 A1 | 4/2010 | Tokuhara |
| 2010/0096181 A1 | 4/2010 | Nakamura |
| 2010/0180701 A1 | 7/2010 | Daniel et al. |
| 2010/0201519 A1 | 8/2010 | Dagher |
| 2010/0230498 A1 | 9/2010 | Atherton |
| 2010/0299401 A1 | 11/2010 | Lloyd |
| 2011/0054979 A1 | 3/2011 | Cova et al. |
| 2011/0139871 A1 | 6/2011 | Yturralde et al. |
| 2011/0192465 A1 | 8/2011 | Collings |
| 2011/0251469 A1 | 10/2011 | Varadan |
| 2012/0161958 A1 | 6/2012 | Turon et al. |
| 2012/0271540 A1 | 10/2012 | Miksa et al. |
| 2012/0278676 A1 | 11/2012 | Teraura |
| 2013/0039239 A1 | 2/2013 | Lin |
| 2013/0107770 A1 | 5/2013 | Marsden et al. |
| 2013/0131980 A1 | 5/2013 | Ginsberg |
| 2013/0250357 A1 | 9/2013 | Yu |
| 2014/0014403 A1 | 1/2014 | Miller et al. |
| 2014/0240088 A1 | 8/2014 | Robinette et al. |
| 2014/0265915 A1 | 9/2014 | Huang et al. |
| 2014/0268780 A1 | 9/2014 | Wang |
| 2014/0274139 A1 | 9/2014 | Bilal et al. |
| 2014/0317406 A1 | 10/2014 | Lewis et al. |
| 2015/0034635 A1 | 2/2015 | Dagher |
| 2015/0154531 A1 | 6/2015 | Skaaksrud |
| 2015/0324745 A1 | 11/2015 | Goodall |
| 2015/0347959 A1 | 12/2015 | Skaaksrud |
| 2015/0349667 A1 | 12/2015 | Andosca et al. |
| 2015/0354973 A1 | 12/2015 | Wang et al. |
| 2015/0382154 A1 | 12/2015 | Bilal et al. |
| 2016/0011074 A1 | 1/2016 | Mian et al. |
| 2016/0026213 A1 | 1/2016 | Li et al. |
| 2016/0110085 A1 | 4/2016 | Barton et al. |
| 2016/0147353 A1 | 5/2016 | Fliz et al. |
| 2016/0188181 A1 | 6/2016 | Smith |
| 2016/0205509 A1 | 7/2016 | Hopcraft et al. |
| 2016/0233927 A1 | 8/2016 | Wu |
| 2016/0239801 A1* | 8/2016 | Burch, V ........... G06Q 10/0838 |
| 2016/0269533 A1 | 9/2016 | Taylor et al. |
| 2016/0270215 A1 | 9/2016 | Goto |
| 2016/0358444 A1 | 12/2016 | Lundy |
| 2016/0370210 A1 | 12/2016 | Kapusta et al. |
| 2016/0377440 A1 | 12/2016 | Dorum |
| 2017/0017872 A1 | 1/2017 | Kato et al. |
| 2017/0025547 A1 | 1/2017 | Cho et al. |
| 2017/0039666 A1 | 2/2017 | Kuersten et al. |
| 2017/0079144 A1 | 3/2017 | Coleman et al. |
| 2017/0161679 A1 | 6/2017 | Stingel et al. |
| 2017/0337405 A1 | 11/2017 | Schutz |
| 2017/0347940 A1 | 12/2017 | Carr |
| 2018/0003507 A1 | 1/2018 | Arslan et al. |
| 2018/0046964 A1 | 2/2018 | Leoni et al. |
| 2018/0104609 A1 | 4/2018 | Musliner |
| 2018/0165568 A1 | 6/2018 | Khoche |
| 2018/0190096 A1 | 7/2018 | Lundy |
| 2019/0026753 A1* | 1/2019 | White ................ G06K 7/10297 |
| 2019/0041836 A1 | 2/2019 | Cella et al. |
| 2019/0066036 A1 | 2/2019 | Roisen et al. |
| 2019/0066047 A1* | 2/2019 | O'Brien ............ G06Q 10/0838 |
| 2019/0250653 A1 | 8/2019 | Conlon |
| 2019/0265082 A1* | 8/2019 | Zafar ....................... H04Q 9/00 |
| 2020/0051007 A1 | 2/2020 | Huberman et al. |
| 2020/0072485 A1 | 3/2020 | LaPalme |
| 2020/0098238 A1* | 3/2020 | Skaaksrud ........... G08B 25/001 |
| 2020/0100115 A1 | 3/2020 | Skaaksrud |
| 2020/0201317 A1* | 6/2020 | Bell ................. G06Q 10/06314 |
| 2020/0275369 A1 | 8/2020 | Foster et al. |
| 2020/0394605 A1* | 12/2020 | Daley ................. G06Q 10/0635 |

(56) References Cited

U.S. PATENT DOCUMENTS

| | | |
|---|---|---|
| 2021/0027122 A1 | 1/2021 | Volkerink et al. |
| 2021/0090020 A1* | 3/2021 | Young ............... G06Q 10/0832 |
| 2022/0100263 A1 | 3/2022 | Nagar et al. |
| 2023/0028603 A1* | 1/2023 | Volkerink .......... G06K 7/10366 |

FOREIGN PATENT DOCUMENTS

| | | |
|---|---|---|
| EP | 1786143 A2 | 5/2007 |
| JP | 2008239282 A | 10/2008 |
| JP | 2009230500 A | 10/2009 |
| JP | 2011090670 A | 5/2011 |
| JP | 2012141995 A | 7/2012 |
| WO | 2014195756 A1 | 12/2014 |
| WO | 2016120628 A1 | 8/2016 |
| WO | 2017046699 A1 | 3/2017 |
| WO | 2017100707 A3 | 7/2017 |

OTHER PUBLICATIONS

Dementyev, SensorTape: Modular and Programmable 3D-Aware Dense Sensor Network on a Tape, In Proc. of UIST 2015.

Griffin et al., Adhesive RFID Sensor Patch for Monitoring of Sweat Electrolytes, in IEEE Transactionson Bio-Medical Engineering, Nov. 2014.

Pyo et al., Development of a Map Matching Method Using the Multiple Hypothesis Technique, 2001 IEEE.

Liu, Survey of Wireless Based Indoor Localization Technologies, arXIV:1709.01015v2 [cs.N1] Mar. 14, 2018.

Cheung et al., Least Squares Algorithms for Time-of-Arrival-Based Mobile Location, IEEE Transactions on Signal Processing, vol. 52, No. 4, Apr. 2004, pp. 1121-1128.

Frazier et al., Fully-Drawn Carbon-Based Chemical Sensors on Organic and Inorganic Surfaces, Lab Chip. Oct. 21, 2014; 14(20): 4059-4066. doi:10.1039/c4lc00864b.

Alsheikh et al., Machine Learning in Wireless Sensor Networks: Algorithms, Strategies, and Applications, arXiv:1405.4463v2 [cs.NI] Mar. 19, 2015.

Farooqui et al., A Paper Based Ink Jet Printed Real Time Location Tracking TAB, 2013 IEEE MTT-S International Microwave Symposium Digest (MTT).

Gong et al., Low-Cost Sensor Tape for Environment Sensing Based on Roll-to-Roll Manufacturing Process, In Proc. of IEEE Sensors 2012.

Olyazadeh, Least Square Approach on Indoor Positioning Measurement Techniques, 2012.

Wimmer et al., Modular and Deformable Touch-Sensitive Surfaces Based on Time Domain Reflectometry, UIST 11 Proceedings of the 24th Annual ACM Symposium on User Interface Software and Technology, pp. 517-526, Santa Barbara, CA, USA, Oct. 16-19, 2011.

Olberding et al., A Cuttable Multi-Touch Sensor, Proceeding UIST, 13 Proceedings of the 26th Annual ACM Symposium on User Interface Software and Technology, pp. 245-254, St. Andrews, Scotland, United Kingdom, Oct. 8-11, 2013.

Zhang et al., Deep Neural Networks for Wireless Localization in Indoor and Outdoor Environments, Neurocomputing 194 (2016), pp. 279-287.

Roundy et al., Energy Harvester for Rotating Environments Using Offset Pendulum and Nonlinear Dynamics, Smart Materials and Structures, IOP Publishing Ltd, Sep. 9, 2014.

Ku et al., Joint Power Waveforming and Beamforming for Wireless Power Transfer, IEEE Transactions on Signal Processing, vol. 65, No. 24, Dec. 15, 2017, p. 6409.

PCT Application No. PCT/US2019/042488, International Search Report and Written Opinion, dated Nov. 5, 2019.

Shen et al., A Mobility Framework to Improve Heterogeneous Wireless Network Services, Inderscience Enterprises Ltd., 2011.

Iacono, Wireless Sensor Network Protocols, Universidad De Mendoza, Argentina, 2011.

Matin et al., Overview of Wireless Sensor Network, Intech, 2012 (http://doi.org/10.5772/49376.1).

Cimino et al., Wireless Communication, Identification, and Sensing Technologies Enabling Integrated Logistics: A Study in the Harbor Environment, Research Gate, Oct. 2015 (https://www.researchgate.net/publication/283117890_Wireless_Communication_Identification_and_Sensing_Technologies_Enabling_Integrated_Logistics_A_Study_in_the_Harbor_Environment).

PCT Application No. PCT/US2019/046588, International Search Report and Written Opinion, dated Jan. 6, 2020.

U.S. Appl. No. 16/891,588, Notice of Allowance dated Feb. 4, 2022, 20 pages.

PCT Application No. PCT/2022/024507, International Search Report and Written Opinion dated Aug. 16, 2022, 10 pages.

International Patent Application No. PCT/2021/053437, International Search Report and Written Opinion dated Jan. 11, 2022, 11 pages.

European Patent Application No. 19837758.2 extended European search report, dated Feb. 25, 2022, 7 pages.

U.S. Appl. No. 17/449,934 Notice of Allowance dated Jun. 14, 2022, 10 pages.

U.S. Appl. No. 17/126,796 Office Action dated Mar. 24, 2022, 11 pages.

* cited by examiner

SYSTEM AND METHOD OF GENERATING ENVIRONMENTAL PROFILES FOR DETERMINING LOGISTICS OF ASSETS

RELATED APPLICATIONS

This application claims priority to U.S. Patent Application Ser. No. 63/087,205, titled "TEMPERATURE SCANS TO PRIORITIZE LOADING AND UNLOADING OF ASSETS", filed Oct. 3, 2020, and claims priority to U.S. Patent Application Ser. No. 63/087,303, titled "LOW LATENCY TEMPERATURE SENSING IN LOW RECEPTION ENVIRONMENTS", filed Oct. 5, 2020, and incorporated herein by reference.

BACKGROUND

During transport, assets often undergo a number of different conditions. Cold chain assets that are sensitive to temperature, such as vaccines or other medicine, dry ice or goods shipped in dry ice, and the like, may degrade in quality if exposed to extremely high or extremely low temperatures for longer than a threshold amount of time. Conventional methods of temperature tracing in asset management rely on users accessing data in retrospect, e.g., collecting data and reviewing the data after the asset has completed transport or at particular checkpoints during transport. As such, it is difficult to immediately identify and correct situations where assets experience problematic temperature profiles in time to maintain the quality or life of the asset, which may result in loss of assets.

Asset management wherein maintaining asset conditions, such as cold chain assets requiring specific temperature conditions, is often difficult when in environments wherein cellular reception or other conventionally used methods of data communication is low. When assets enter low reception environments, captured sensor data is frequently delayed until a connection is reestablished, resulting in high-risk conditions wherein assets may degrade, lose quality, or become undeliverable going unnoticed and uncorrected.

SUMMARY

A wireless sensing system, comprising at least one tape node, each tape node adhered to a respective asset, comprising at least one sensor, the at least one tape node having a first processor, a first memory communicatively coupled with the first processor, the first memory storing machine-readable instructions that, when executed by the first processor, cause the first processor to: capture, by the at least one sensor of the at least one tape node, environmental data; generate, based on the captured environmental data, at least one environmental profile; determine, based on comparing the environmental profile to an accepted environmental profile, that a difference between the environmental profile and an accepted environmental profile satisfies a predetermined threshold; and responsive to the difference satisfying the threshold, generate a notification that includes instructions to perform an action.

A wireless sensing system, comprising: at least one intelligent node adhered to an asset, with at least one sensor for collecting environmental data from a surrounding environment; a gateway intelligent node communicatively coupled to the at least one intelligent node and operable to collect data from the at least one intelligent node; and a client device communicatively coupled to at least the gateway intelligent node operable to receive data collected from the at least one intelligent node, from the gateway intelligent node.

A method, comprising responsive to establishing, by a client device, a wireless connection with at least one intelligent node adhered to an asset, receiving, by the client device, from the at least one intelligent node, a first set of data; determining, based on the received first set of data, a schedule for delivery of the asset; and presenting, by the client device, instructions for delivery of the asset.

A wireless sensing system, comprising at least one intelligent gateway node; at least one intelligent node having at least one sensor and attached to an asset, and having a first processor, a first memory communicatively coupled with the first processor, the first memory storing machine readable instructions that, when executed by the first processor, cause the first processor to: identify a loss of connection to a first communications connection; establish a second communications connection to the at least one intelligent gateway node; and transmit, via the second communications connection, an environmental profile, based on environmental data captured by the at least one sensor.

A method, comprising identifying, by a first intelligent node of a wireless sensing system, a loss of cellular reception; establishing, by the first intelligent node, a communications connection with a second intelligent node; and transmitting, by the first intelligent node, environmental data captured by at least one environmental sensors of the first intelligent node via the communication connection with the second intelligent node.

DETAILED DESCRIPTION OF THE EMBODIMENTS

Figure 1:
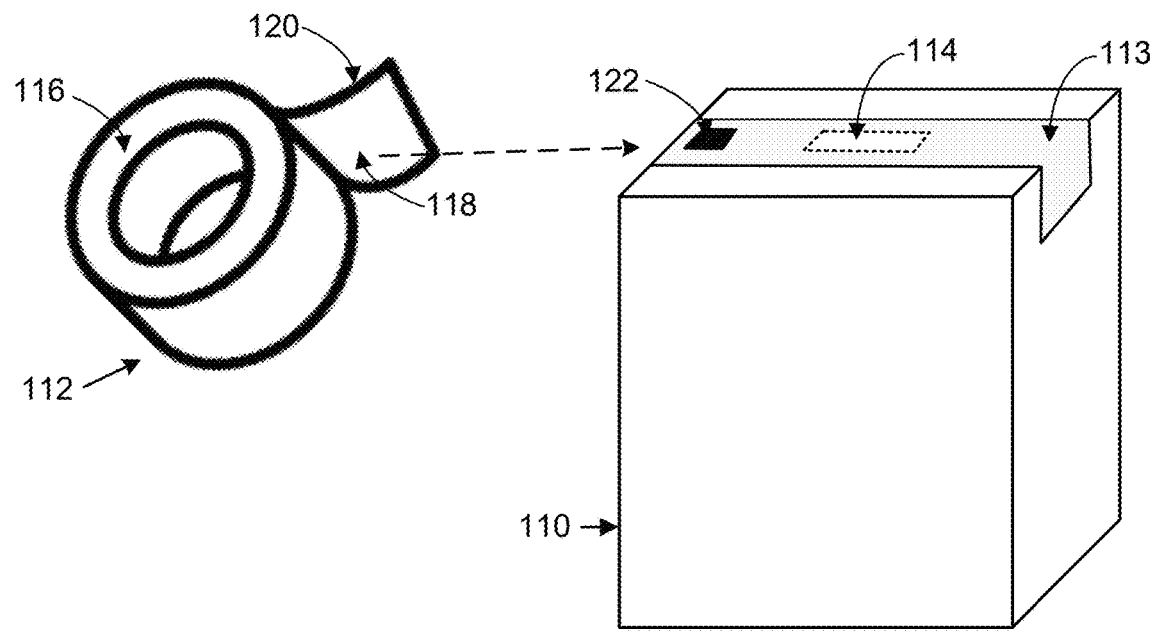
FIG. 1 is a diagrammatic view of a segment of an example adhesive tape platform dispensed from a roll used to detect tampering of an asset, according to an embodiment.

In some embodiments, the wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 7A-C and/or 8A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, positioning, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. Examples of such applications include event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

FIG. 1 shows an example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
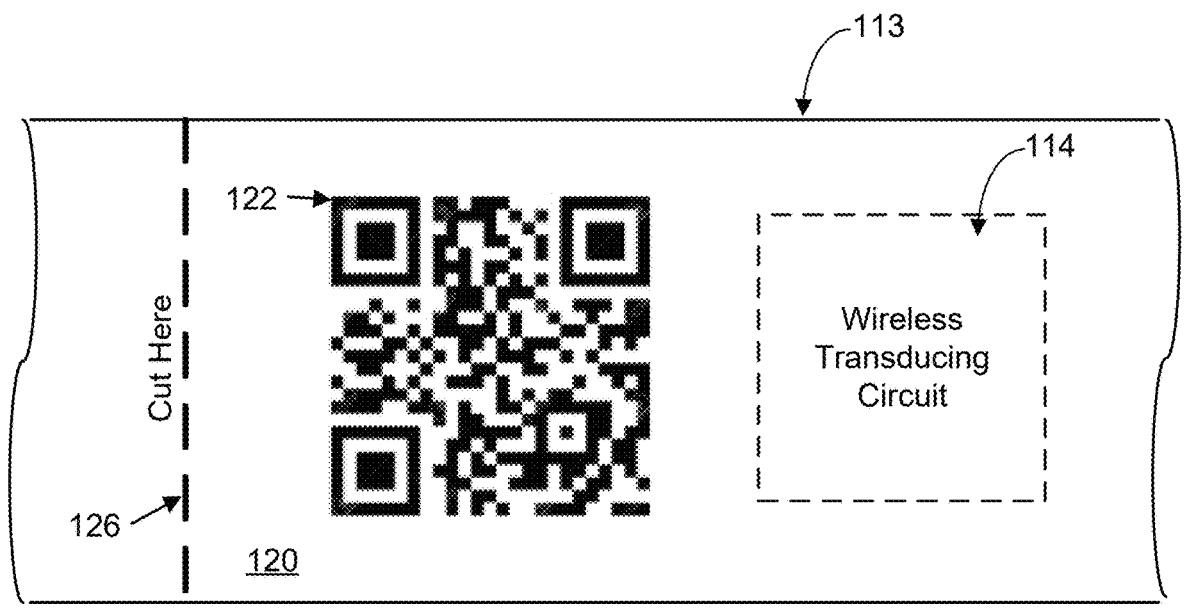
FIG. 2 is a diagrammatic top view of a portion of the segment of the example adhesive tape platform shown in FIG. 1, according to an embodiment.

FIG. 2 shows the non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example in FIG. 2, the segment 113 of the adhesive tape agent platform 112 includes an identifier 122 (e.g., a two-dimensional bar code, such as a QR Code), written instructions 124 (e.g., "Cut Here"), and an associated cut line 126 that indicates where the user should cut the adhesive tape agent platform 112. The written instructions 124 and the cut line 126 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 126 may demarcate the boundaries between adjacent segments at locations that are free of any active components of the wireless transducing circuit 114. The spacing between the wireless transducing circuit 114 and the cut lines 126 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 126. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 126).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
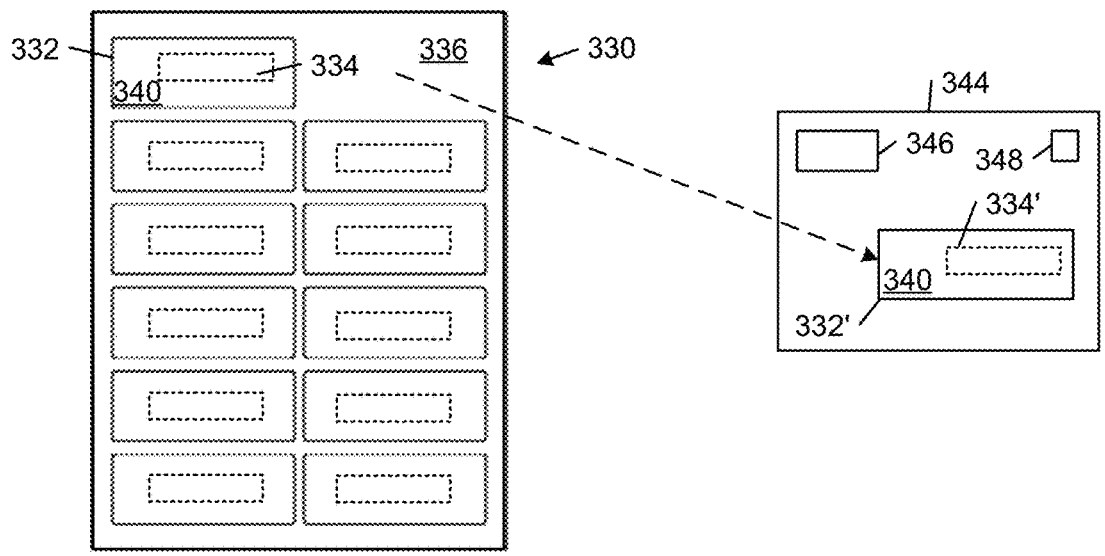
FIG. 3 is a diagrammatic view of an example of an envelope carrying a segment of an example adhesive tape platform dispensed from a backing sheet, according to an embodiment.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 344 also includes a return address 346 and, optionally, a postage stamp or mark 348.

In some examples, segments of the adhesive tape platform 112 are deployed by a human operator. The human operator may be equipped with a mobile phone or other device that allows the operator to authenticate and initialize the adhesive tape platform 112. In addition, the operator can take a picture of a parcel including the adhesive tape platform and any barcodes associated with the parcel and, thereby, create a persistent record that links the adhesive tape platform 12 to the parcel. In addition, the human operator typically will send the picture to a network service and/or transmit the picture to the adhesive tape platform 112 for storage in a memory component of the adhesive tape platform 112.

In some examples, the wireless transducing circuit components 34 that are embedded in a segment 332 of the adhesive tape platform 112 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
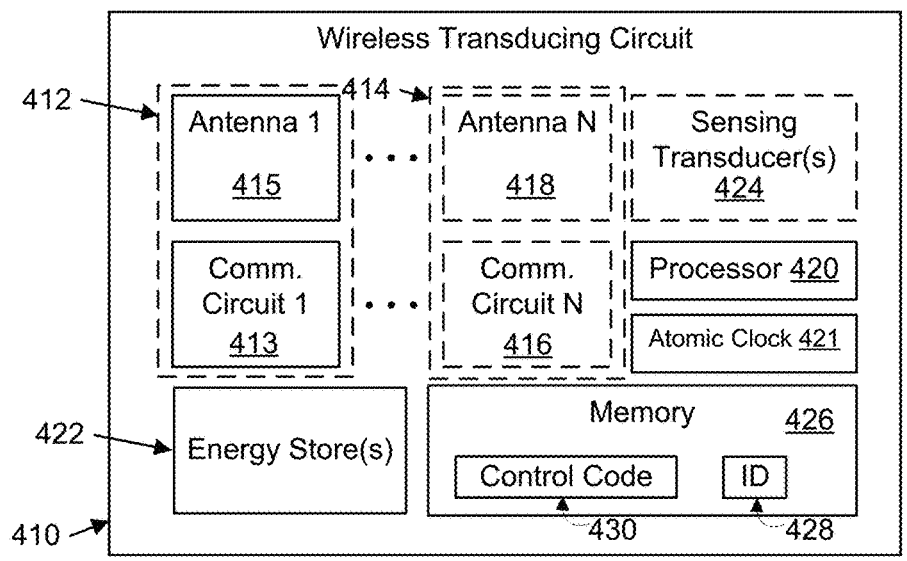
FIG. 4 is a schematic view of an example segment of an adhesive tape platform, according to an embodiment.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Figure 6A:
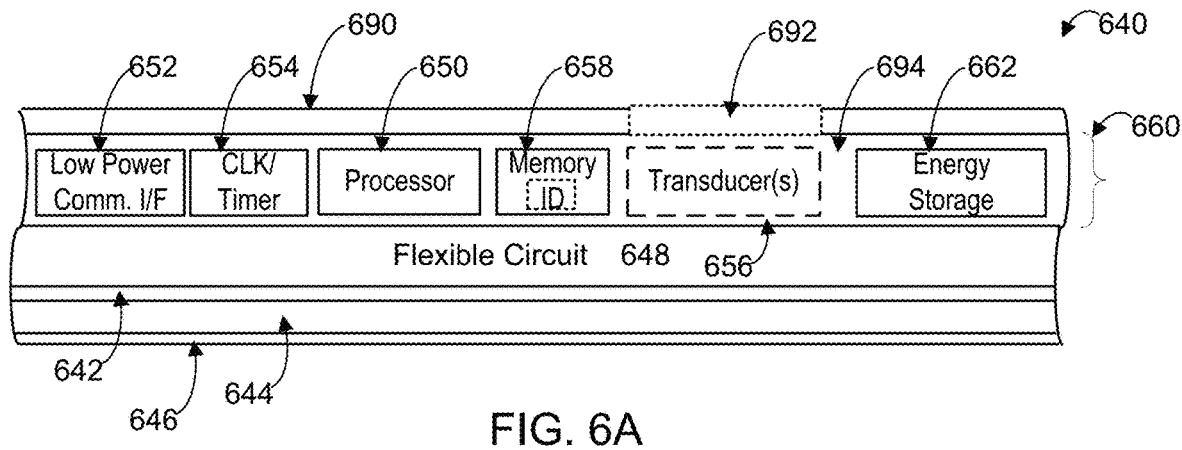
FIGS. 6A-C show diagrammatic cross-sectional side views of portions of different respective adhesive tape platforms, according to an embodiment.
Figure 6B:
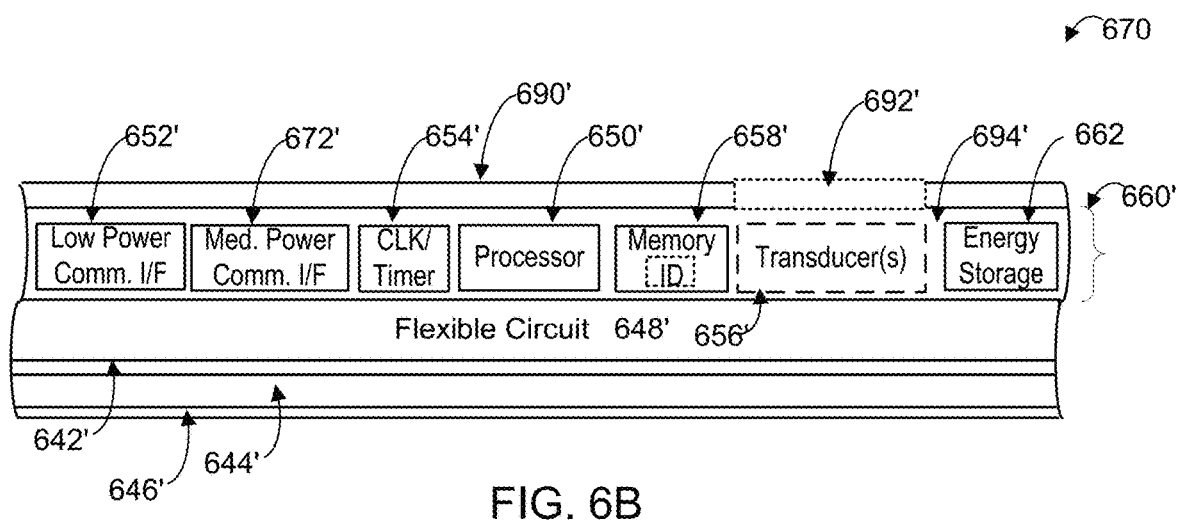
Figure 6C:
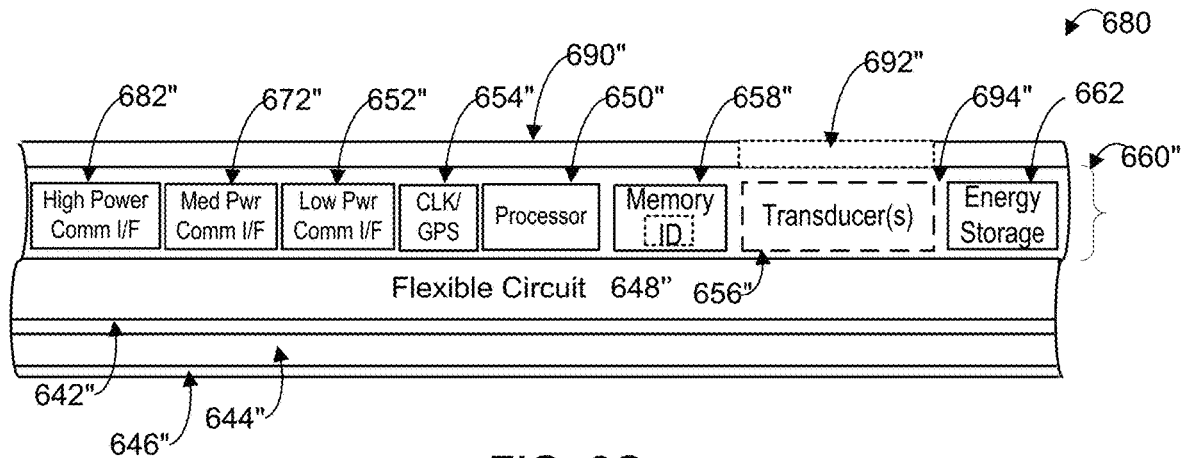

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 6A-C. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
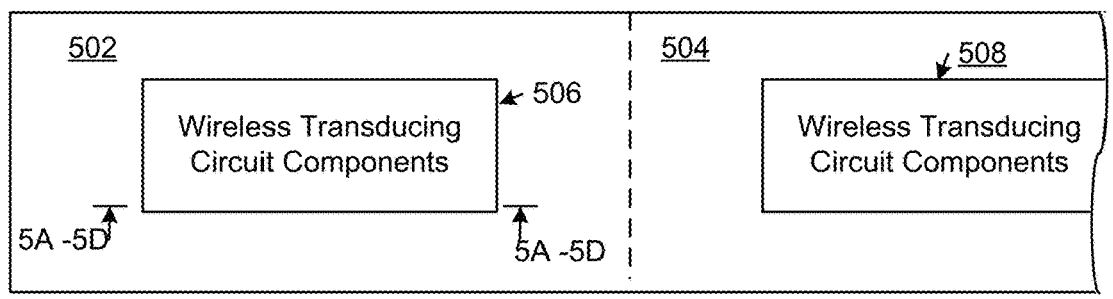
FIG. 5 is a diagrammatic top view of a length of an example adhesive tape platform, according to an embodiment.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 7A:
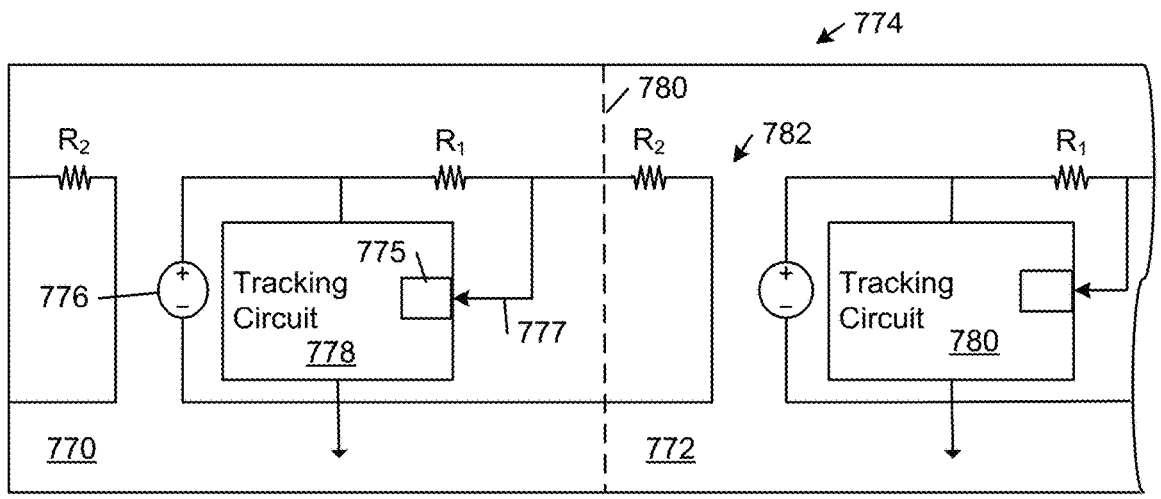
FIGS. 7A-C are diagrammatic top views of a length of an example tracking adhesive tape product, according to an embodiment.
Figure 7B:
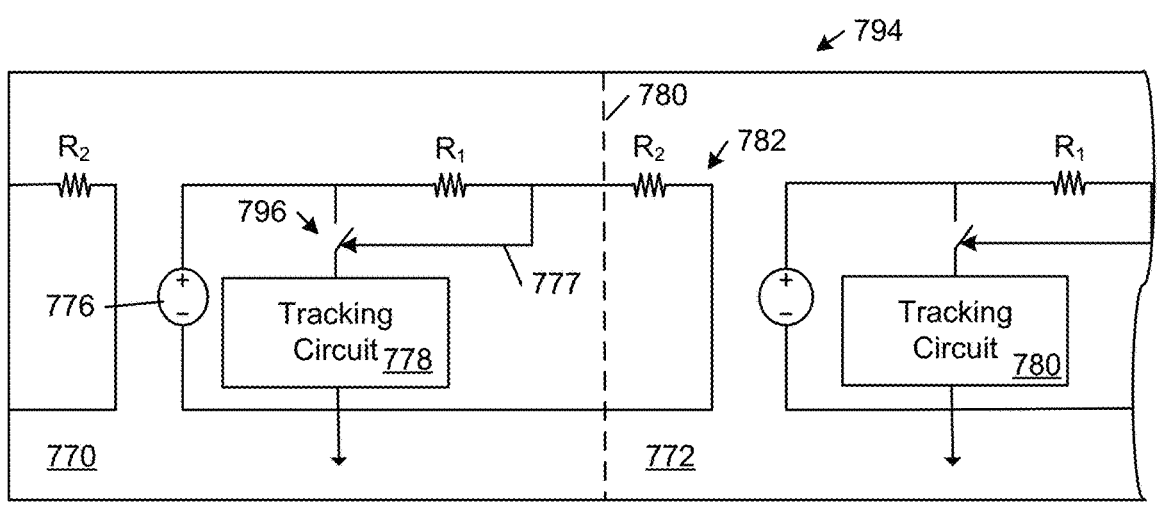
Figure 7C:
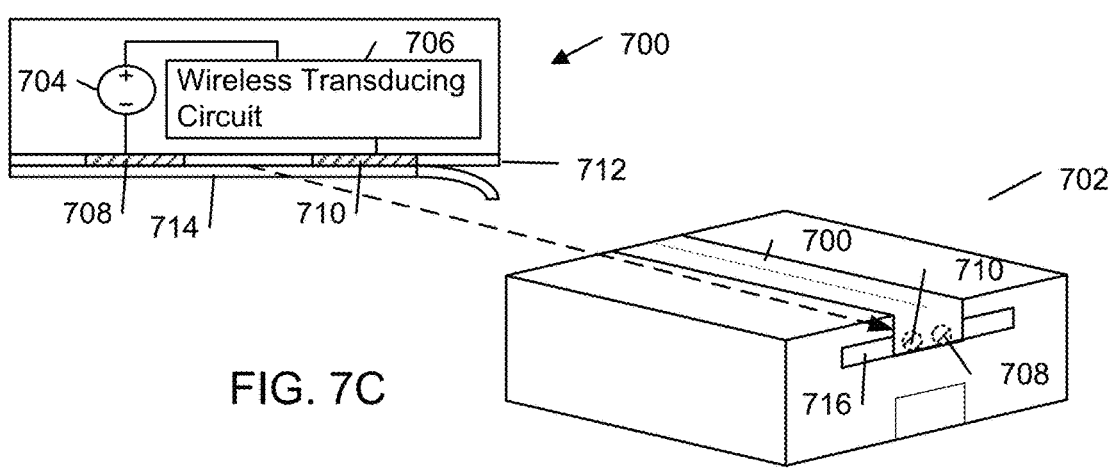

An example method of fabricating the adhesive tape platform 500 according to a roll-to-roll fabrication process is described in connection with FIGS. 5A-5C and as shown in FIGS. 7A and 7C of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A shows a cross-sectional side view of a portion of an example segment 640 of a flexible adhesive tape agent platform (e.g., platform 502 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 502 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656,

656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648". The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Depending on the target application, the wireless transducing circuits 410 are distributed across the flexible adhesive tape platform 500 according to a specified sampling density, which is the number of wireless transducing circuits 410 for a given unit size (e.g., length or area) of the flexible adhesive tape platform 500. In some examples, a set of multiple flexible adhesive tape platforms 500 are provided that include different respective sampling densities in order to seal different asset sizes with a desired number of wireless transducing circuits 410. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 410. In some example applications (e.g., shipping low value goods), only one wireless transducing circuit 410 is used per asset, whereas in other applications (e.g., shipping high value goods) multiple wireless transducing circuits 410 are used per asset. Thus, a flexible adhesive tape platform 500 with a lower sampling density of wireless transducing circuits 410 can be used for the former application, and a flexible adhesive tape platform 100 with a higher sampling density of wireless transducing circuits 410 can be used for the latter application. In some examples, the flexible adhesive tape platforms 500 are color-coded or otherwise marked to indicate the respective sampling densities with which the wireless transducing circuits 410 are distributed across the different types of adhesive tape platforms 500.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

FIG. 7C shows a diagrammatic cross-sectional front view of an example adhesive tape platform 700 and a perspective view of an example asset 702. Instead of activating the adhesive tape platform 700 in response to separating a segment of the adhesive tape platform 700 from a roll or a sheet of the adhesive tape platform, this example is configured to supply power from the energy source 702 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

An example network communications environment 800 (herein used interchangeably with "network 800") includes a plurality of wireless nodes configured to detect tampering in assets (or other forms of events, such as temperature differentials, humidity differentials, acceleration differentials, etc.). Tampering may include, but is not limited to, opening assets such as boxes, containers, storage, or doors (e.g., of an asset container 764), moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the network 800. The network 800 is configured to provide a notification or alert to a user (e.g., authenticated user) of the network 800. In some embodiments, a wireless node may directly transmit the notification or alert to the user (e.g., to a client device, such as the mobile gateway 810, of a user). In other embodiments, a wireless node may include a display that indicates whether or not a tampering event has occurred (e.g., the display may be an indicator light or LED).

Alerts may be transmitted to the server/cloud, other wireless nodes, a client device, or some combination thereof, as discussed below. For example, in an embodiment, a wireless node of the network 800 captures sensor data, detects a tampering event, and transmits an alarm to a user of the wireless sensing system (e.g., without communicating with a server or cloud of the wireless sensing system). In another embodiment, a wireless node of the network 800 captures sensor data and transmits the sensor data to a gateway, parent node (e.g., black tape), or client device. The gateway, parent node, or client device detects a tampering event based on the received sensor data and transmits an alarm to a user of the network 800. In another embodiment, the wireless node of the network 800 captures sensor data, detects a tampering event, and transmits information describing the tampering event to a server or cloud of the network 800, in the form of a list with tampering events at specific times, along with which tape node or containers were tampered with, as shown in table 1502, discussed in FIG. 15. The server or cloud of the wireless sensing system transmits an alarm to a user of the wireless sensing system.

Figure 8:
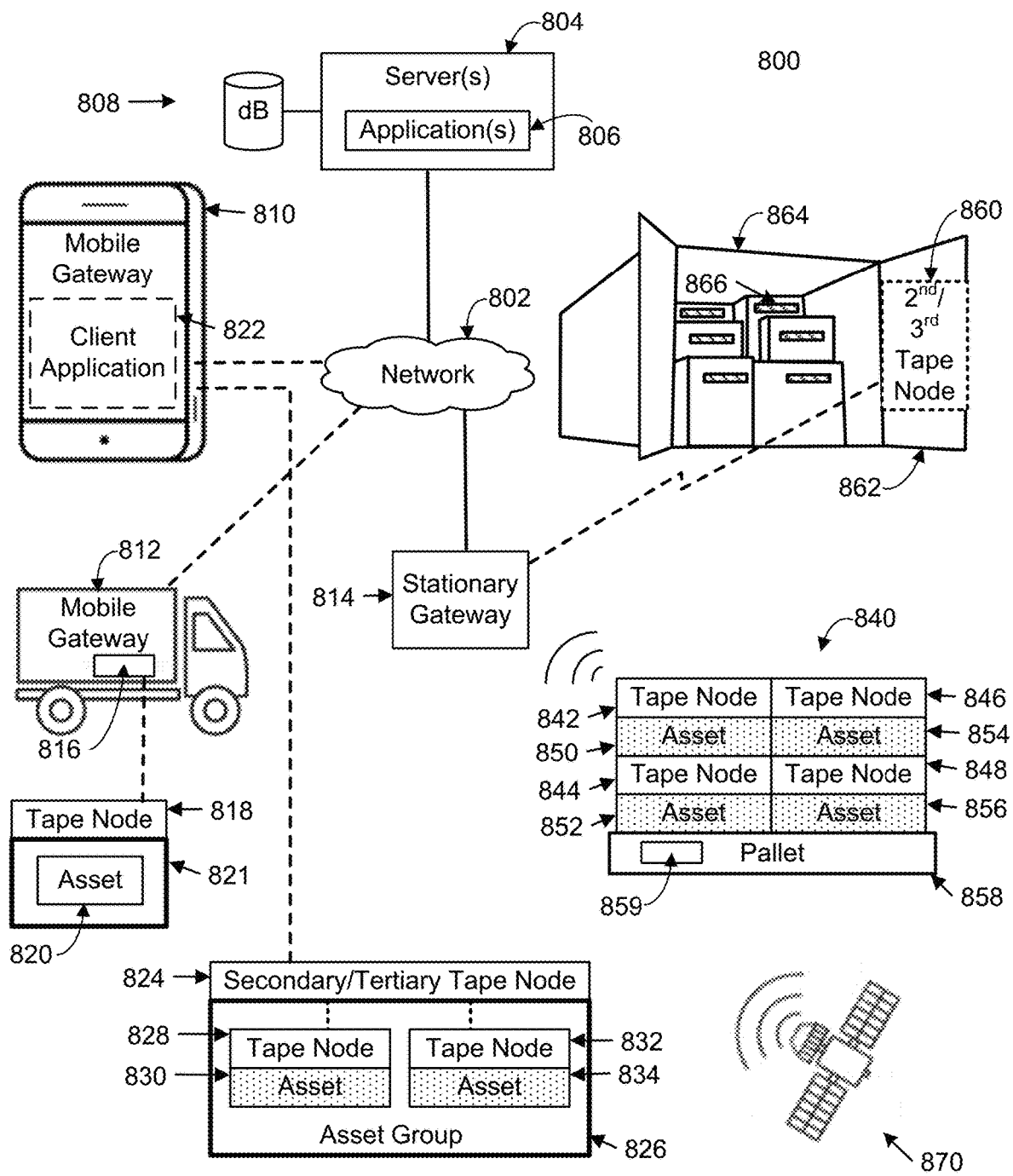
FIG. 8 is a diagrammatic view of an example of a wireless sensing system supporting communications with segments of an adhesive tape platform, according to an embodiment.

FIG. 8 shows an example network communications environment 800 (herein used interchangeably with "network 800" and "wireless sensing system 800") that includes a network 802 that supports communications between one or more servers 804 executing one or more applications of a network service 808, mobile gateways 810 (a smart device mobile gateway), 812 (a vehicle mobile gateway), a stationary gateway 814, and various types of tape nodes that are associated with various assets (e.g., parcels, equipment, tools, persons, and other things). Hereinafter "tape nodes" may be used interchangeably with the "agents", as described above, with reference to FIGS. 1-6; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 802 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 802 includes communications infrastructure equipment, such as a geolocation satellite system 870 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 820) or other stationary (e.g., stationary gateway 814) or mobile object (e.g., a, such as a delivery truck, such as mobile gateway 812) or stationary object (e.g., a structural element of a building). This process activates the tape node (e.g., the tape node 818) and causes the tape node 818 to communicate with the one or more servers 804 of the network service 808. In this process, the tape node 418 may communicate through one or more other tape nodes (e.g., the tape nodes 842, 844, 846, 848) in the communication hierarchy. In this process, the one or more servers 804 executes the network service application 806 to programmatically configure tape nodes 818, 824, 828, 832, 842, 844, 846, 848, that are deployed in the network communications environment 800. In some examples, there are multiple classes or types of tape nodes (e.g., the master agent 842-848, 859, secondary agent 824, 860, or tertiary agent 824, 860 shown in FIG. 8), where each tape node class has a different respective set of functionalities and/or capacities, as described above with respect to the "agents" in FIGS. 1-6. For example, the master agents 842-848, 859 (with reference to FIG. 6A have a lower-power wireless communication interface (e.g., the low-power wireless-communication interface 652, with reference to FIG. 6A), in comparison to the secondary and tertiary agents 824, 860 (with reference to FIG. 6B,C).

In some examples, the one or more servers 804 communicate over the network 802 with one or more gateways 810, 812, 814 that are configured to send, transmit, forward, or relay messages to the network 802 in response to transmissions from the tape nodes 818, 824, 828, 832, 842, 844, 846, 848 that are associated with respective assets and within communication range. Example gateways include mobile gateways 810, 812 and a stationary gateway 814. In some examples, the mobile gateways 810, 812, and the stationary gateway 814 are able to communicate with the network 802 and with designated sets or groups of tape nodes.

In some examples, the mobile gateway 812 is a vehicle (e.g., a delivery truck or other mobile hub) that includes a wireless communications unit 816 that is configured by the network service 808 to communicate with a designated network of tape nodes, including tape node 818 (e.g., a master tape node) in the form of a label that is adhered to a parcel 821 (e.g., an envelope) that contains an asset 820, and is further configured to communicate with the network service 808 over the network 802. In some examples, the tape node 818 includes a lower-power wireless-communications interface of the type used in, e.g., segment 640 (shown in FIG. 6A), and the wireless communications unit 816 may implemented by a secondary or tertiary tape node (e.g., one of segment 670 or segment 680, respectively shown in FIGS. 6B and 6C) that includes a lower-power communications interfaces for communicating with tape nodes within range of the mobile gateway 812 and a higher-power communications-interface for communicating with the network 802. In this way, the tape node 818 and wireless communications unit 816 create a hierarchical wireless network of tape nodes for transmitting, forwarding, bridging, relaying, or otherwise communicating wireless messages to, between, or on behalf of the tape node 818 in a power-efficient and cost-effective way.

In some examples, a mobile gateway 810 is a mobile phone that is operated by a human operator and executes a client application 822 that is configured by a network service to communicate with a designated set of tape nodes, including a secondary or tertiary tape node 824 that is adhered to a parcel 826 (e.g., a box), and is further configured to communicate with a server 804 over the network 802. In some embodiments, the client application 822 is accessible to authorized users and the authorize users may have varying levels of access to data stored in the network 800. For example, an employee (e.g., border patrol agent) at a checkpoint may have more access than a non-employee user, who may be granted a temporary access for a limited purpose of tracking a particular asset during the voyage, with a final destination to the non-employee user. This limited access for the non-employee user may be to ensure a safe chain-of-custody from end-to-end, without tampering, and it may be applicable to any type of asset.

In some embodiments, the client application 822 is installed on a mobile device (e.g., smartphone) that may also operate as mobile gateway 810. The client application 822 may cause the mobile device to function as a mobile gateway 810. For example, the client application 822 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 822) relays that data to the server 804 via cellular (2G, 3G, 4G, 5G) or Wi-Fi. Further, the client application 822 may cause the mobile device to establish a connection with, and receive pings (e.g., alerts to nearby assets that an environmental profile threshold has been exceeded), from the tape nodes or from the server 804. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 822 may share location data with the tape node, allowing the tape node to pinpoint its location.

In the illustrated example, the parcel 826 contains a first parcel labeled or sealed by a master tape node 828 and containing a first asset 830, and a second parcel labeled or sealed by a master tape node 832 and containing a second asset 834. The secondary or tertiary tape node 824 communicates with each of the master tape nodes 828, 832 and also communicates with the mobile gateway 810. In some examples, each of the master tape nodes 828, 832 includes a lower-power wireless-communications interface of the type used in, e.g., segment 640 (shown in FIG. 6A), and the secondary/tertiary tape node 824 is implemented by a tape node (e.g., segment 670 or segment 680, shown in FIGS. 6B and 6C) that includes a low-power communications interface for communicating with the master tape nodes 828, 832 contained within the parcel 826, and a higher-power communications interface for communicating with the mobile gateway 810. The secondary or tertiary tape node 824 is operable to relay wireless communications between the master tape nodes 828, 832 contained within the parcel 826 and the mobile gateway 810, and the mobile gateway 810 is operable to relay wireless communications between the secondary or tertiary tape node 824 and the server 804 over the network 802. In this way, the master tape nodes 828 and 832 and the secondary or tertiary tape node 824 create a wireless network of nodes for transmitting, forwarding, relaying, or otherwise communicating wireless messages to, between, or on behalf of the master tape nodes 828, 832, the secondary or tertiary tape node 824, and the network service (not shown) in a power-efficient and cost-effective way.

In some examples, the stationary gateway 814 is implemented by a server 804 executing a network service application 806 that is configured by the network service 808 to communicate with a designated set 840 of master tape nodes 842, 844, 846, 848 that are adhered to respective parcels containing respective assets 850, 852, 854, 856 on a pallet 858. In other examples, the stationary gateway 814 is implemented by a secondary or tertiary tape node 860 (e.g., segments 670 or 680, respectively shown in FIGS. 6B and 6C) that is adhered to, for example, a wall, column or other infrastructure component of the physical premise's environment 800, and includes a low-power communications interface for communicating with nodes within range of the stationary gateway 814 and a higher-power communications interface for communicating with the network 802.

In one embodiment, each of the master tape nodes 842-748 is a master tape node and is configured by the network service 808 to communicate individually with the stationary gateway 814, which relays communications from the master tape nodes 842-848 to the network service 808 through the stationary gateway 814 and over the network 802. In another embodiment, one of the master tape nodes 842-848 at a time is configured to transmit, forward, relay, or otherwise communicate wireless messages to, between, or on behalf of the other master nodes on the pallet 858. In this embodiment, the master tape node may be determined by the master tape nodes 842-848 or designated by the network service 808. In some examples, the master tape nodes 842-848 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 859 is adhered to the pallet 858 and is configured to perform the role of a master node for the other master tape nodes 842-848. In these ways, the master tape nodes 842-848, 859 are configurable to create different wireless networks of nodes for transmitting, forwarding, relaying, bridging, or otherwise communicating wireless messages with the network service 408 through the stationary gateway 814 and over the network 802 in a power-efficient and cost-effective way.

In the illustrated example, the stationary gateway 814 also is configured by the network service 808 to communicate with a designated network of tape nodes, including the secondary or tertiary tape node 860 that is adhered to the inside of a door 862 of an asset container 864, and is further configured to communicate with the network service 808 over the network 802. In the illustrated example, the asset container 864 contains a number of parcels labeled or sealed by respective master tape nodes 866 and containing respective assets. The secondary or tertiary tape node 860 communicates with each of the master tape nodes 866 within the asset container 864 and communicates with the stationary gateway 814. In some examples, each of the master tape nodes 866 includes a low-power wireless communications-interface (e.g., the low-power wireless-communication interface 652, with reference to FIG. 6A), and the secondary or tertiary tape node 860 includes a low-power wireless-communications interface (low-power wireless-communication interfaces 652', 652", with reference to FIGS. 6B-6C) for communicating with the master tape nodes 866 contained within the asset container 864, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 814. In some examples, either a secondary or tertiary tape node, or both, may be used, depending on whether a high-power wireless-communication interface is necessary for sufficient communication.

In some examples, when the doors of the asset container 864 are closed, the secondary or tertiary tape node 860 is operable to communicate wirelessly with the master tape nodes 866 contained within the asset container 864. In some embodiments, both a secondary and a tertiary node are attached to the asset container 864. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 860 is configured to collect sensor data from master tape nodes 866 and, in some embodiments, process the collected data to generate, for example, statistics from the collected data. When the doors of the asset container 864 are open, the secondary or tertiary tape node 860 is programmed to detect the door opening (e.g., using a photodetector or an accelerometer component of the secondary or tertiary tape node 860) and, in addition to reporting the door opening event to the network service 808, the secondary or tertiary tape node 860 is further programmed to transmit the collected data and/or the processed data in one or more wireless messages to the stationary gateway 814. The stationary gateway 814, in turn, is operable to transmit the wireless messages received from the secondary or tertiary tape node 860 to the network service 808 over the network 802. Alternatively, in some examples, the stationary gateway 814 also is operable to perform operations on the data received from the secondary or tertiary tape node 860 with the same type of data produced by the secondary or tertiary tape node 860 based on sensor data collected from the master tape nodes 842-848. In this way, the secondary or tertiary tape node 860 and master tape node 866 create a wireless network of nodes for transmitting, forwarding, relaying, or otherwise communicating wireless messages to, between, or on behalf of the master tape node 866, the secondary or tertiary tape nodes 860, and the network service 808 in a power-efficient and cost-effective way.

In an example of the embodiment shown in FIG. 8, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-6). The short-range master tape nodes typically are adhered directly to parcels containing assets. In the illustrated example, the master tape nodes 818, 828, 832, 842-848, 866 are short-range tape nodes. The short-range tape nodes typically communicate with a low-power wireless-communication protocol (e.g., Bluetooth LE, Zigbee, or Z-wave). The segment 670 typically adheres to objects (e.g., a parcel 826 and an asset container 864) that are associated with multiple parcels that are separated from the medium-range tape nodes by a barrier or a long distance. In the illustrated example, the secondary and/or tertiary tape nodes 824 and 860 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 800.

In the illustrated example, the mobile gateway 812 and the stationary gateway 814 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 812 (e.g., a truck). In these examples, the wireless communications unit 816 may be moved to different locations in the network communications environment 800 to assist in connecting other tape nodes to the wireless communications unit 816. In some examples, the stationary gateway 814 is a tape node that may be attached to a stationary structure (e.g., a wall) in the network communications environment 800 with a known geographic location (e.g., GPS coordinates). In these examples, other tape nodes in the environment may determine their geographic location by querying the stationary gateway 814.

In some examples, in order to conserve power, the tape nodes typically communicate according to a schedule promulgated by the network service 808. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 804, either directly or indirectly through a gateway tape node (e.g., the long-range tape node, such as wireless communication unit 816, adhered to the mobile gateway 812, or a long-range tape node, such as stationary gateway 814, that is adhered to an infrastructure component of the network communications environment 800). In other examples, the master tape node processes the information contained in the received data packets and transmits the processed information to the server 804.

Figure 9:
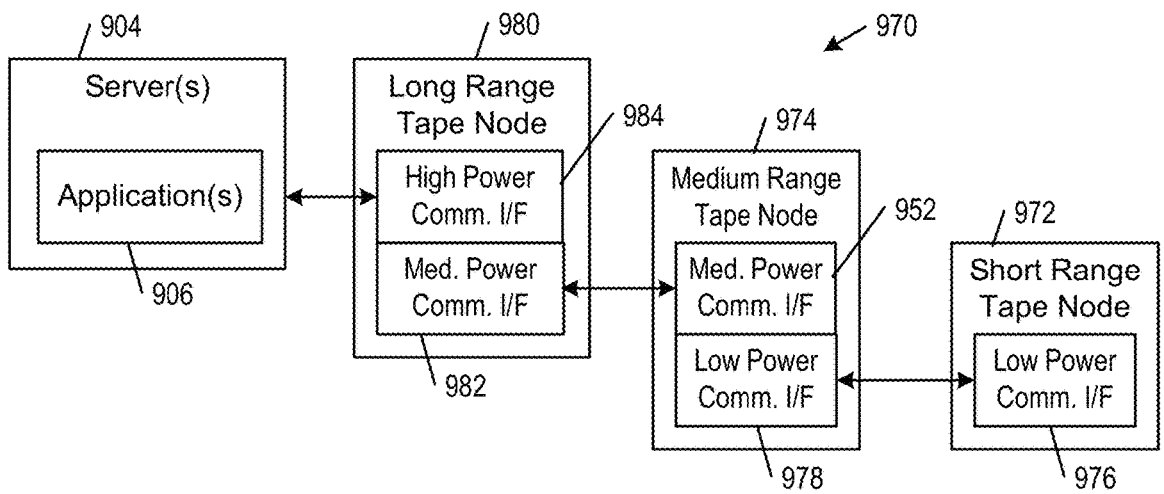
FIG. 9 is a diagrammatic view of a hierarchical communications network including an adhesive tape platform, according to an embodiment.

FIG. 9 shows an example hierarchical wireless communications network of tape nodes 970. In this example, the short-range tape node 972 and the medium range tape node 974 communicate with one another over their respective low power wireless communication interfaces 976, 978. The medium range tape node 974 and the long-range tape node 980 communicate with one another over their respective medium power wireless communication interfaces 978, 982. The long-range tape node 980 and the one or more network service servers 904 communicate with one another over the high-power communication interface 984. In some examples, the low power communication interfaces 976, 978 establish wireless communications with one another in accordance with the Bluetooth LE protocol, the medium power communication interfaces 986, 982 establish wireless communications with one another in accordance with the LoRa communications protocol, and the high-power communication interface 984 establishes wireless communications with the one or more network service servers 904 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 904 of the network service 908 designates a tape node at a higher level in a hierarchical communications network as a master node of a designated set of tape nodes at a lower level in the hierarchical communications network. For example, the designated master tape node may be adhered to a parcel (e.g., a box, a pallet, or asset container) that contains one or more tape nodes that are adhered to one or more packages containing respective assets. In order to conserve power, the tape nodes typically communicate according to a schedule promulgated by the one or more network service servers 904 of the network service 908. The schedule usually dictates all aspects of the communication, including the times when particular tape nodes should communicate, the mode of communication, and the contents of the communication. In one example, the one or more network service servers 904 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 904, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the network 800). In other examples, the master tape node processes the information contained in the received data packets and transmits the processed information to the one or more network service servers 904.

Figure 10:
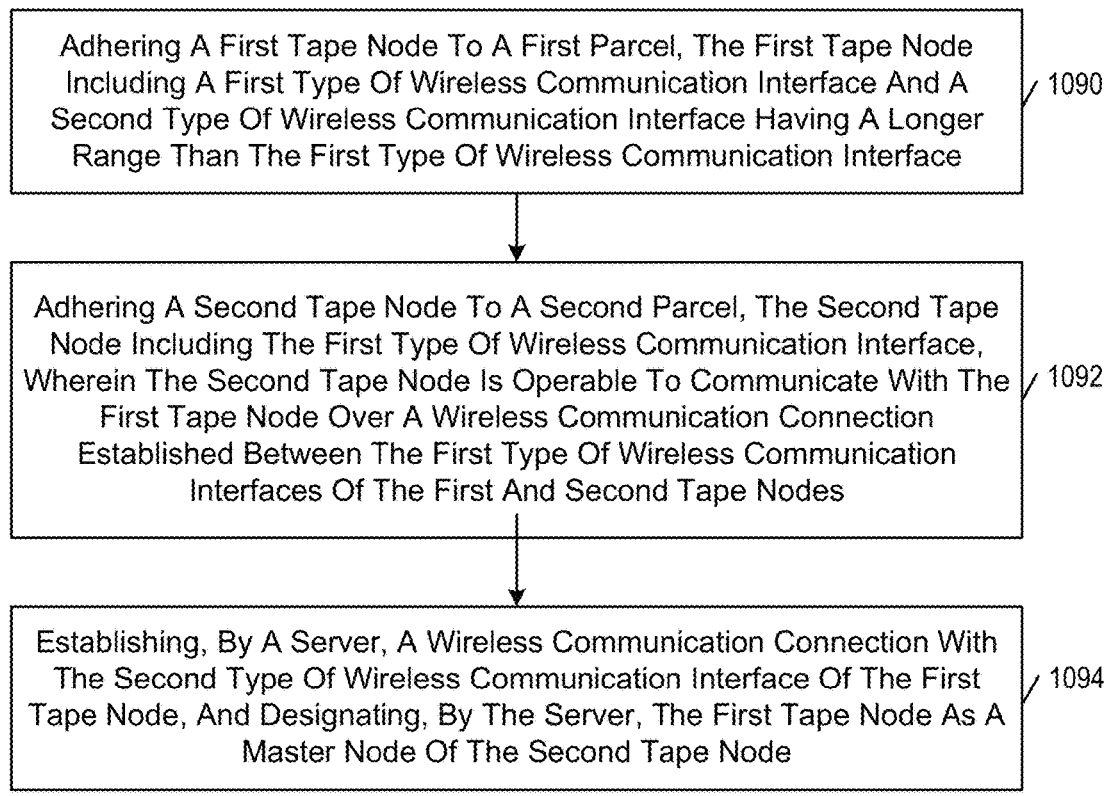
FIG. 10 is a flow diagram of a method of creating the hierarchical communications network, according to an embodiment.

FIG. 10 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 10, block 1090). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 10, block 1092). An application executing on a computer system (e.g., the one or more network service servers 904 of a network service 906) establishes a wireless communication connection with the second type of wireless communication interface of the first tape node, and the application transmits programmatic code executable by the first tape node to function as a master tape node with respect to the second tape node (FIG. 10, block 1094).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs). In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces).

A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server. Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 11A:
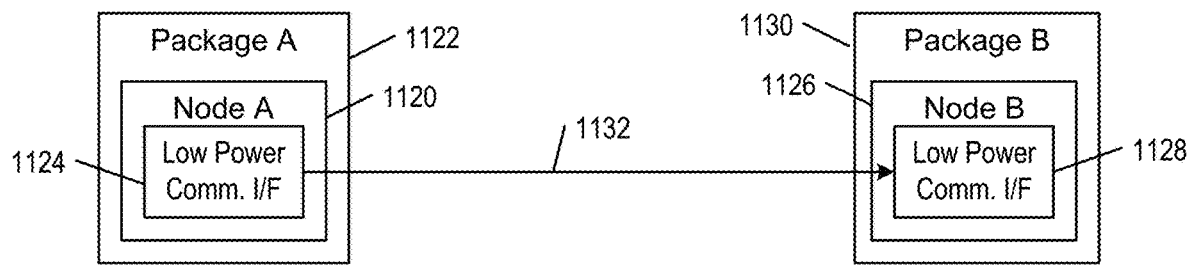
FIGS. 11A-E are diagrammatic views showing example use cases for a distributed wireless sensing system, according to an embodiment.

Referring to FIG. 11A, a node 1120 (Node A) is associated with a package 1122 (Package A). In some embodiments, the node 1120 may be implemented as a tape node that is used to seal the package 1122 or it may be implemented as a label node that is used to label the package 1122; alternatively, the node 1120 may be implemented as a non-tape node that is inserted within the package 1122 or embedded in or otherwise attached to the interior or exterior of the package 1122. In the illustrated embodiment, the node 1120 includes a low power communications interface 1124 (e.g., a Bluetooth Low Energy communications interface). Another node 1126 (Node B), which is associated with another package 1130 (Package B), is similarly equipped with a compatible low power communications interface 1128 (e.g., a Bluetooth Low Energy communications interface).

In an example scenario, in accordance with the programmatic code stored in its memory, node 1126 (Node B) requires a connection to node 1120 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1120 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1132 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 11B:
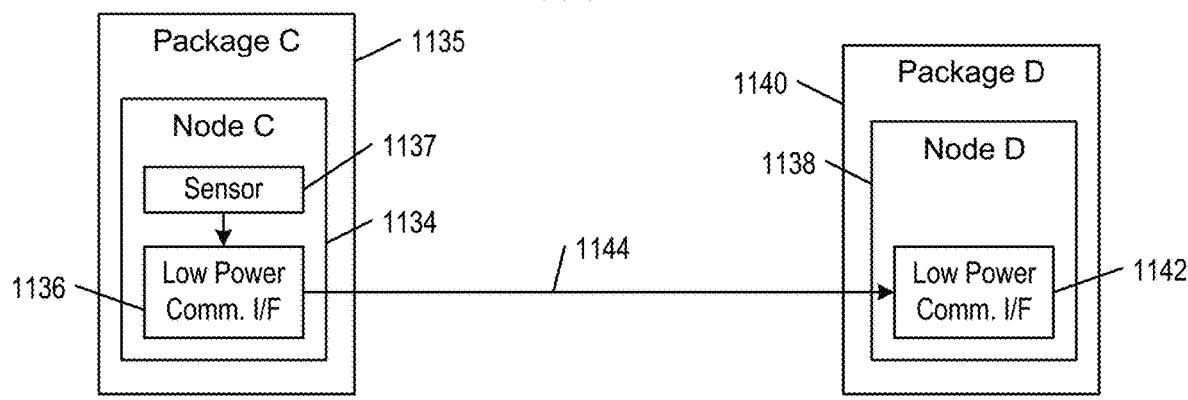

Referring to FIG. 11B, a node 1134 (Node C) is associated with a package 1135 (Package C). In the illustrated embodiment, the Node C includes a low power communications interface 1136 (e.g., a Bluetooth Low Energy communications interface), and a sensor 1137 (e.g., a temperature sensor). Another node 1138 (Node D), which is associated with another package 1140 (Package D), is similarly equipped with a compatible low power communications interface 1142 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D.

In this process, Node C and Node D determine each other's identities, capabilities, and services. For example, after successfully establishing a communication path 1144 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 11C:
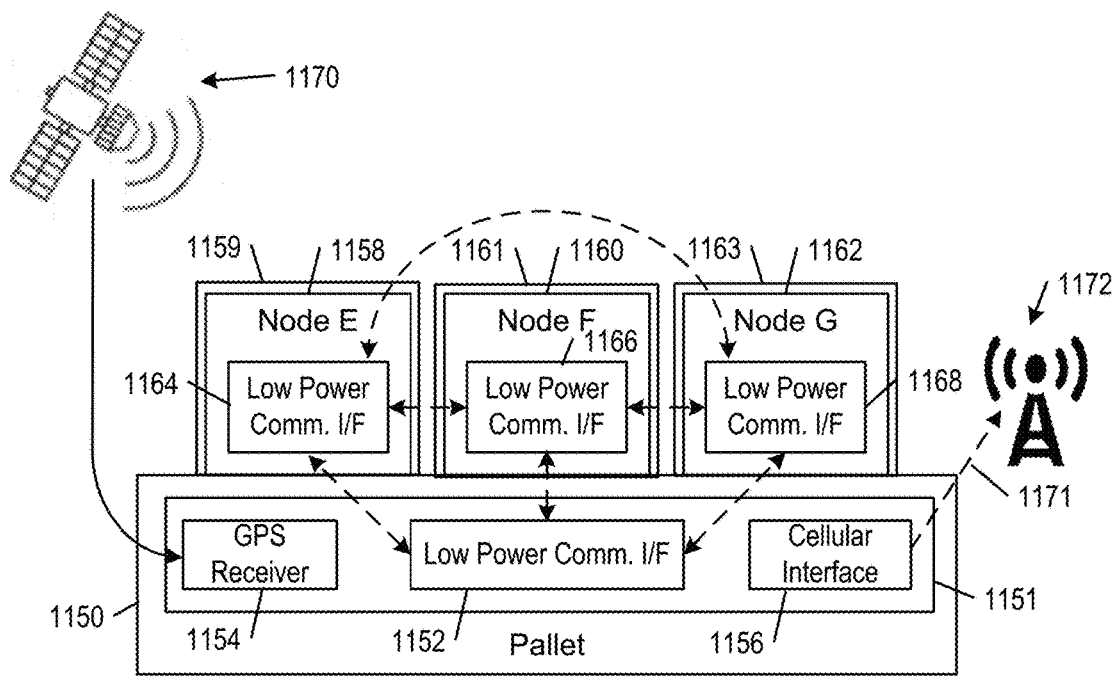

Referring to FIG. 11C, a pallet 1150 is associated with a master node 1151 that includes a low-power communications interface 1152, a GPS receiver 1154, and a cellular communications interface 1156. In some embodiments, the master node 1151 may be implemented as a tape node or a label node that is adhered to the pallet 1150. In other embodiments, the master node 1151 may be implemented as a non-tape node that is inserted within the body of the pallet 1150 or embedded in or otherwise attached to the interior or exterior of the pallet 1150.

The pallet 1150 provides a structure for grouping and containing packages 1159, 1161, 1163 each of which is associated with a respective peripheral node 1158, 1160, 1162 (Node E, Node F, and Node G). Each of the peripheral nodes 1158, 1160, 1162 includes a respective low power communications interface 1164, 1166, 1168 (e.g., Bluetooth Low Energy communications interface). In the illustrated embodiment, each of the nodes E, F, G, and the master node 1151 are connected to each of the other nodes over a respective low power communications path (shown by dashed lines).

In some embodiments, the packages 1159, 1161, 1163 are grouped together because they are related. For example, the packages 1159, 1161, 1163 may share the same shipping itinerary or a portion thereof. In an example scenario, the master pallet node 1151 scans for advertising packets that are broadcasted from the peripheral nodes 1158, 1160, 1162. In some examples, the peripheral nodes broadcast advertising packets during respective scheduled broadcast intervals. The master node 1151 can determine the presence of the packages 1159, 1161, 1163 in the vicinity of the pallet 1150 based on receipt of one or more advertising packets from each of the nodes E, F, and G. In some embodiments, in response to receipt of advertising packets broadcasted by the peripheral nodes 1158, 1160, 1162, the master node 1151 transmits respective requests to the server to associate the master node 1151 and the respective peripheral nodes 1158, 1160, 1162. In some examples, the master tape node requests authorization from the server to associate the master tape node and the peripheral tape nodes. If the corresponding packages 1159, 1161, 1163 are intended to be grouped together (e.g., they share the same itinerary or certain segments of the same itinerary), the server authorizes the master node 1151 to associate the peripheral nodes 1158, 1160, 1162 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1151 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1158, 1160, 1162 include environmental sensors for obtaining information regarding environmental conditions in the vicinity of the associated packages 1159, 1161, 1163. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1151 can determine its own location based on geolocation data transmitted by a satellite-based radio navigation system 1170 (e.g., GPS, GLONASS, and NAVSTAR) and received by the GPS receiver 1154 component of the master node 1151. In an alternative embodiment, the location of the master pallet node 1151 can be determined using cellular based navigation techniques that use mobile communication technologies (e.g., GSM, GPRS, CDMA, etc.) to implement one or more cell-based localization techniques. After the master node 1151 has ascertained its location, the distance of each of the packages 1159, 1161, 1163 from the master node 1151 can be estimated based on the average signal strength of the advertising packets that the master node 1151 receives from the respective peripheral node. The master node 1151 can then transmit its own location and the locations of the package nodes E, F, and G to a server over a cellular interface connection with a cellular network 1172. Other methods of determining the distance of each of the packages 1159, 1161, 1163 from the master node 1151, such as Received Signal-Strength Index (RSSI) based indoor localization techniques, also may be used.

In some embodiments, after determining its own location and the locations of the peripheral nodes, the master node 1151 reports the location data and the collected and optionally processed (e.g., either by the peripheral nodes peripheral nodes 1158, 1160, 1162 or the master node 1151) sensor data to a server over a cellular communication path 1171 on a cellular network 1172.

In some examples, nodes are able to autonomously detect logistics execution errors if packages that are supposed to travel together no longer travel together and raise an alert. For example, a node (e.g., the master node 1151 or one of the peripheral nodes 1158, 1160, 1162) alerts the server when the node determines that a particular package 1159 is being or has already been improperly separated from the group of packages. The node may determine that there has been an improper separation of the particular package 1159 in a variety of ways. For example, the associated peripheral node 1158 that is bound to the particular package 1159 may include an accelerometer that generates a signal in response to movement of the package from the pallet. In accordance with its intelligent agent program code, the associated peripheral node 1158 determines that the master node 1151 has not disassociated the particular package 1159 from the group and therefore broadcasts advertising packets to the master node, which causes the master node 1151 to monitor the average signal strength of the advertising packets and, if the master node 1151 determines that the signal strength is decreasing over time, the master node 1151 will issue an alert either locally (e.g., through a speaker component of the master node 1151) or to the server.

Figure 11D:
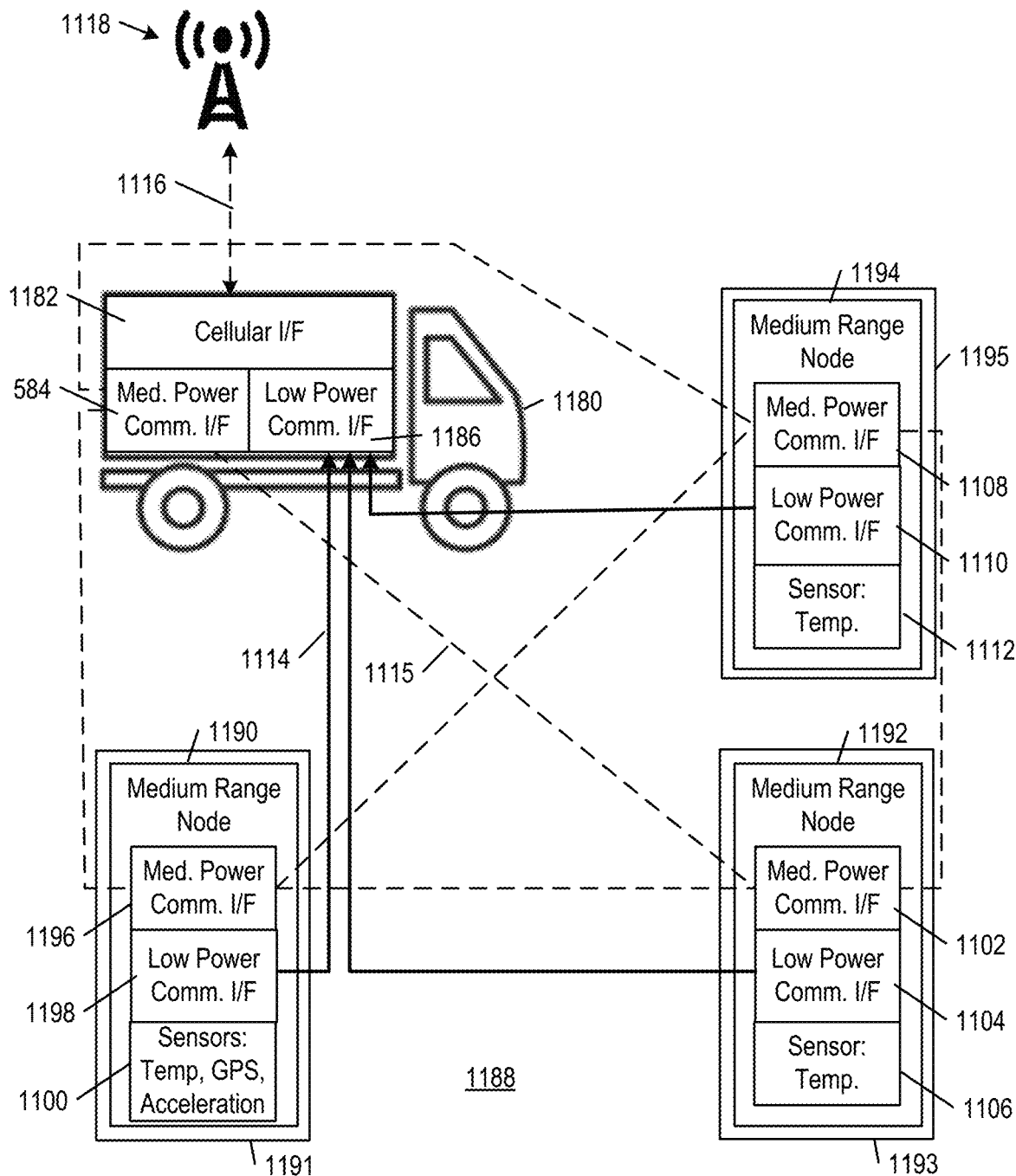

Referring to FIG. 11D, a truck 1180 is configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1094 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1117), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 11E:
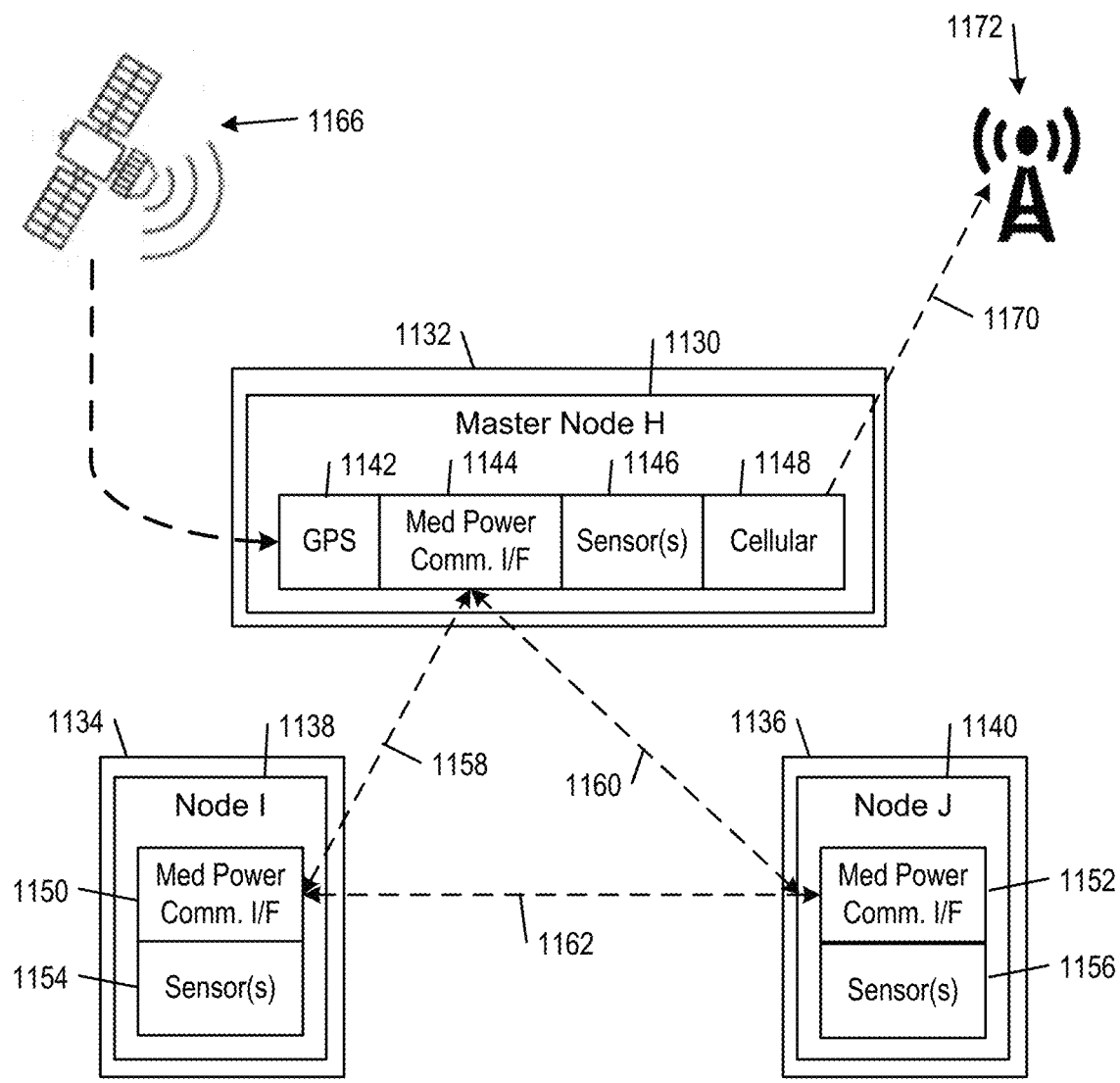

Referring to FIG. 11E, a master node 1130 is associated with a logistic item 1132 (e.g., a package) and grouped together with other logistic items 1134, 1136 (e.g., packages) that are associated with respective peripheral nodes 1138, 1140. The master node 1130 includes a GPS receiver 1142, a medium power communications interface 1144, one or more sensors 1146, and a cellular communications interface 1148. Each of the peripheral nodes 1138, 1140 includes a respective medium power communications interface 1150, 1152 and one or more respective sensors 1154, 1156. In the illustrated embodiment, the peripheral and master nodes are connected to one another other over respective pairwise communications paths (shown by dashed lines). In some embodiments, the nodes 1130, 1138, 1140 communicate through respective LoRa communications interfaces over LoRa formatted communications paths 1158, 1160, 1162.

In the illustrated embodiment, the master and peripheral nodes 1130, 1138, 1140 include environmental sensors for obtaining information regarding environmental conditions in the vicinity of the associated logistic items 1132, 1134, 1136. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1130 periodically broadcasts advertising packets in the surrounding area. When the peripheral nodes 1138, 1140 are within range of master node 1130, and are operating in a listening mode, the peripheral nodes 1138, 1140 will extract the address of master node 1130 and potentially other information (e.g., security information) from the advertising packets. If, according to their respective programmatic code, the peripheral nodes 1138, 1140 determine that they are authorized to connect to the master node 1130, the peripheral nodes 1138, 1140 will attempt to pair with the master node 1130. In this process, the peripheral nodes 1138, 1140 and the master node 1130 determine each other's identities, capabilities, and services. For example, after successfully establishing a respective communication path 1158, 1160 with each of the peripheral nodes 1138, 1140 (e.g., a LoRa formatted communication path), the master node 1130 determines certain information about the peripheral nodes 1138, 1140, such as their identity information (e.g., peripheral nodes), their capabilities (e.g., measuring temperature data), and their services include transmitting temperature data to other nodes.

After establishing LoRa formatted communications paths 1158, 1160 with the peripheral nodes 1138, 1140, the master node 1130 transmits requests for the peripheral nodes 1138, 1140 to transmit their measured and/or locally processed temperature data to the master node 1130.

In the illustrated embodiment, the master node 1130 can determine its own location based on geolocation data transmitted by a satellite-based radio navigation system 1166 (e.g., GPS, GLONASS, and NAVSTAR) and received by the GPS receiver 1142 component of the master node 1130. In an alternative embodiment, the location of the master node 1130 can be determined using cellular based navigation techniques that use mobile communication technologies (e.g., GSM, GPRS, CDMA, etc.) to implement one or more cell-based localization techniques. After the master node 1130 has ascertained its location, the distance of each of the logistic items 1134, 1136 from the master node 1130 can be estimated based on the average signal strength of the advertising packets that the master node 1130 receives from the respective peripheral node. The master node 1130 can then transmit its own location and the locations of the package nodes H, J, and I to a server over a cellular interface connection with a cellular network 1172. Other methods of determining the distance of each of the logistic items 1134, 1136 from the master node 1130, such as Received Signal-Strength Index (RSSI) based indoor localization techniques, also may be used.

In some embodiments, after determining its own location and the locations of the peripheral nodes, the master node 1130 reports the location data, the collected and optionally processed (e.g., either by the peripheral nodes peripheral nodes 1138, 1140 or the master node 1130) sensor data to a server over a cellular communication path 1170 on a cellular network 1172.

Figure 12A:
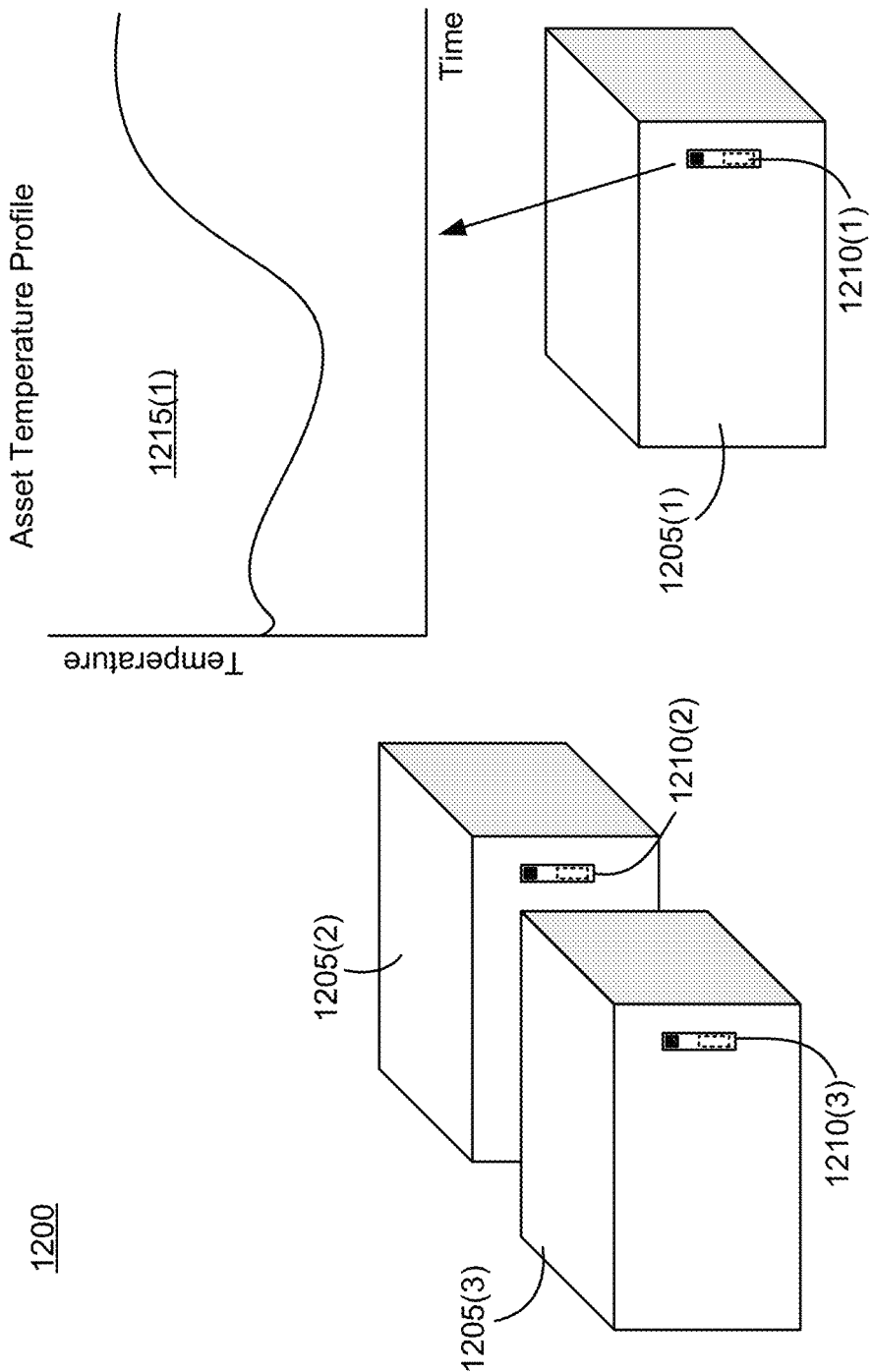
FIG. 12A is a schematic diagram showing an example of tape nodes capturing environmental data from a surrounding environment, according to an embodiment.
Figure 12B:
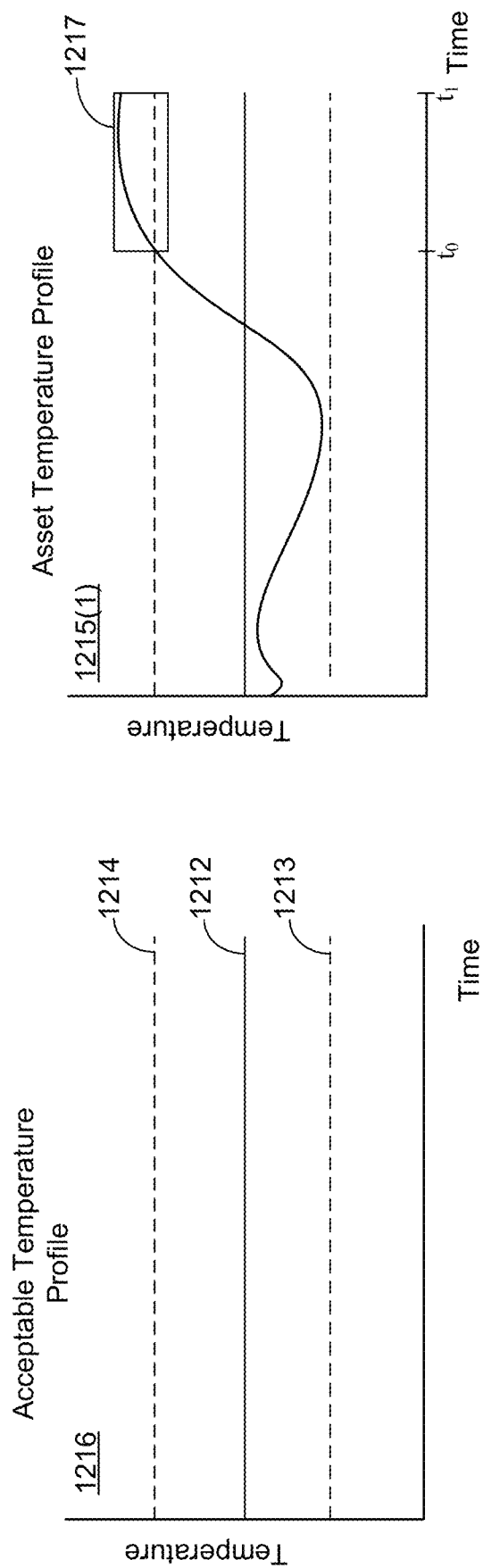
FIG. 12B is a schematic diagram showing an example of an acceptable temperature profile and a temperature profile, according to an embodiment.
Figure 12C:
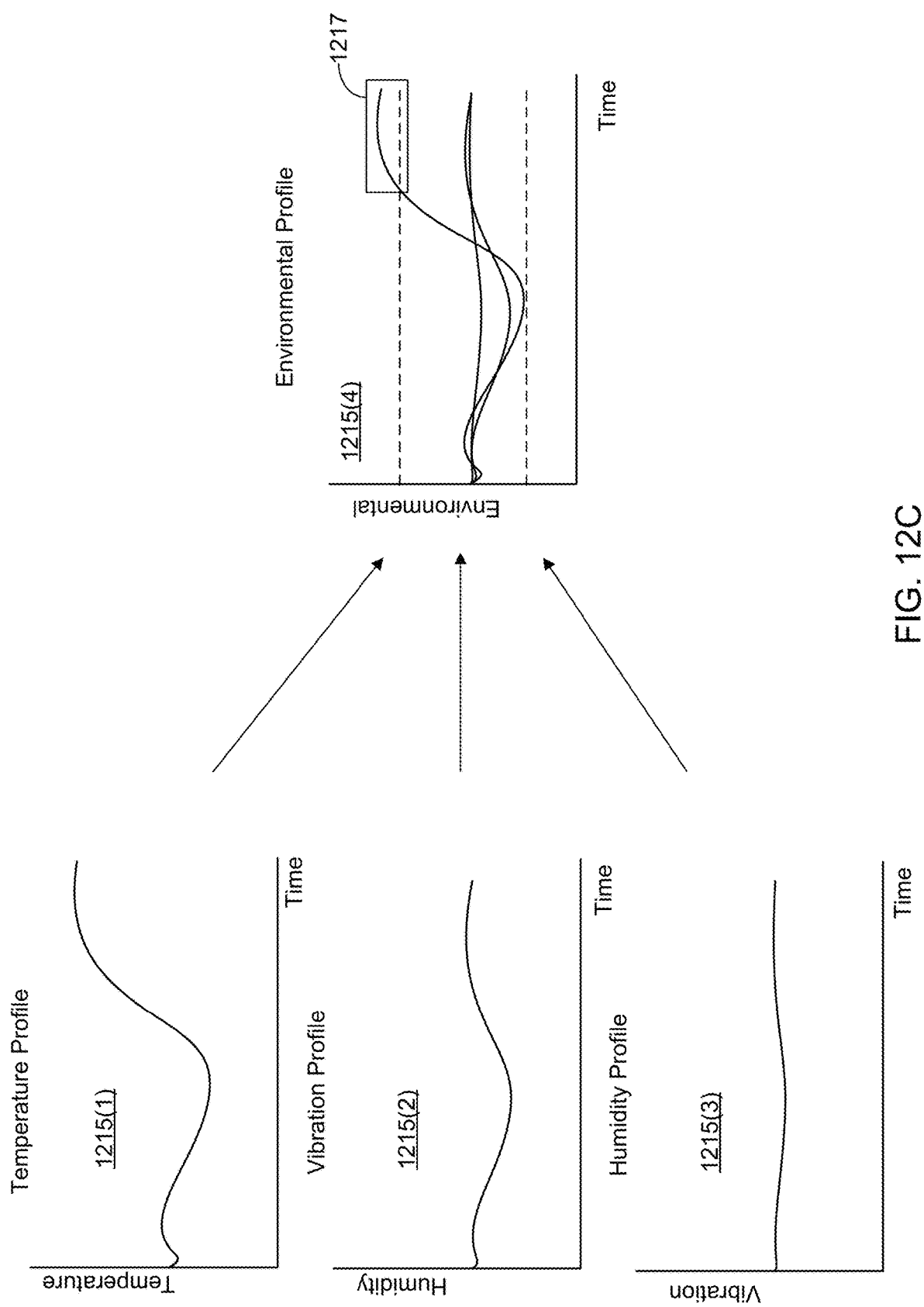
FIG. 12C is a schematic diagram showing an example of an environmental profile that includes a temperature profile, a humidity profile, and a vibration profile, according to an embodiment.

FIGS. 12A-C are described together. FIG. 12A illustrates an example of tape nodes 1210(1)-(3) (which may be referred collectively as "tape nodes 1210") capturing environmental data from a surrounding environment 1200. The tape nodes 1210 (e.g., tape nodes 818, 824, 828, 832, 842, 844, 846, 848, 859, 860, etc.) are part of a wireless sensing system (e.g., wireless sensing system 800) and are each adhered to a different one of the assets 1205(1)-(3) (which may be referred collectively as "assets 1205") (e.g., packages, substantially similar to assets 820, 830, 834, 850-856, etc.) during transport of the assets 1205(1)-(3). In one example, the assets 1205(1)-(3) are being transported from a shipping center or manufacturing facility to a final destination, by various modes of transportation (e.g., flight, sea vessel, ground). The node 1210(1) has sensors (e.g., temperature sensors, altitude sensors, vibration sensors, etc., as described above) for sensing characteristics (e.g., temperature, humidity, vibration, etc.) of the environment 1200 and forming an environmental profile (e.g., environmental profile 1215(4)), which is a collective of a temperature profile 1215(1), vibration profile 1215(2), humidity profile 1215(3) during transport, as shown in FIG. 12C.

In some embodiments, the tape nodes 1210(1)-(3) only have Bluetooth. In some embodiments, the tape nodes 1210(1)-(3) are equipped to include cellular communication systems. In some embodiments, the tape nodes 1210(1)-(3) are equipped to include satellite communication systems for emergencies (e.g., when the asset is an organ for organ transplant). In some embodiments, the tape nodes 1210(1)-(3) include Bluetooth, cellular, and satellite.

In some embodiments, each of the assets 1205 may have a single sensor (e.g., temperature sensor, humidity sensor, vibration sensor, etc.), create one of a temperature profile 1215(1), a vibration profile 1215(2), or a humidity profile 1215(3), and may collaborate to create an environmental profile (e.g., the environmental profile 1215(4); FIG. 12C). For ease of discussion, embodiments of the present disclosure discuss a temperature profile 1215(1) and use tape node 1210(1) and asset 1205(1); but an environmental profile 1215(4) may include a combination of different types of sensed environmental characteristics (e.g., humidity, temperature, vibration, etc.; as illustrated in FIG. 12C) without departing from the scope of the present embodiments. For example, the environmental profile 1215(4) may include any combination of vibration profile, humidity profile, altitude profile, acceleration profile, etc., as shown in FIG. 12C.

Temperature profile 1215(1) is a graph showing temperature conditions within the surrounding environment 1200 of asset 1205(1) over time. Where the assets 1205(1) is temperature sensitive, receiving notice when the asset is subjected to a temperature change outside of an acceptable temperature profile 1216 (as shown in FIG. 12B) during transit and prior to delivery may reduce the likelihood of damaging the asset. The acceptable temperature profile 1216 includes an acceptable temperature 1212 for the asset 1205(1) and minimum and maximum acceptable temperatures 1213, 1214, respectfully. For example, the asset 1205(1) (medicine, perishables, etc.) may be acceptably exposed to 30° C. temperatures for 5 minutes, but should not be exposed to 25° C. temperatures for 45 minutes. If, for example, the tape node may transmit a notification to a smart device (used by, or proximate to, an authorized user) that the asset has undergone a temperature change beyond an acceptable level (maximum and minimum acceptable temperatures 1213, 1214, of acceptable temperature profile 1216, FIG. 12B), the authorized user may be able to deliver the asset before the asset is damaged by the temperature by receiving a notification which causes the user to expedite the delivery or move the asset to a new environment which is more hospitable for the asset. In some embodiments, acceptable temperature profiles are determined by integrating across the temperature profile or by integrating across a portion of the temperature profile. In embodiments, the tape nodes 1210(1)-(3) (or the server 804, mobile gateway 812, and/or stationary gateway 814) can integrate the temperature for the entirety of the history (integrate from time=0 to time=current time) or integrate a portion (integrate from time=current time-delta to time=current time). Each tape node 1210(1)-(3) may determine (e.g., based on the type of asset 1205) an acceptable temperature profile for a respective asset 1205(1)-(3). In some embodiments, the temperature may be integrated for the entire duration the temperature exceeds a minimum or maximum temperature 1213, 1214, respectively (e.g., as indicated by the box 1217).

In an embodiment, a machine learning model or artificial intelligence (AI) is trained to determine acceptable profiles 1216 of various types of environmental data (e.g., temperature, vibration, humidity, etc.) for assets 1205(1)-(3) based on asset types (e.g., medicine, perishable good, etc.), packaging (e.g., material, thickness, and other packaging properties), and other factors. In some embodiments, machine learning models (e.g., run or accessible by the server(s) 804, FIG. 8, mobile gateway 810, 812, stationary gateway 814, etc.) may use linear regression, logistic regression, decision tree, support vector machines (SVM), neural networks, gradient boosting algorithms, and the like. Machine learning models may be trained using supervised or unsupervised training on historic data sets of asset temperature profiles 1215(1) over previous asset transports and end condition of assets. For example, the historical data may include transport routes, environmental data collected by the tape node 1210 sensors, frequency of environmental data collection, time of year, time of day, the packaging material of assets, whether a customer returned an asset for being damaged by an environmental condition, etc. In one example, the tape nodes 1205(1)-(3) collected the historic data and transmitted the historic data to the database 808. The server(s) 804 inputs the historic data to the machine learning models to receive an acceptable temperature profile 1215(1), to be forwarded to the tape nodes 1205(1)-(3) for referencing during transport. The outputted acceptable temperature profile 1216 may include a minimum and maximum temperature 1213, 1214 and a length of time for how long the asset may withstand the minimum and/or maximum acceptable temperatures 1213, 1214, and actions to take for when the asset endures the minimum and/or maximum temperatures.

In some embodiments, the maximum and minimum acceptable temperatures 1213, 1214, respectively, depend on the amount of time the asset is exposed to the temperature. For example, the asset 1205 may withstand a first maximum temperature 1213 for five minutes but cannot withstand a second maximum temperature (higher than the first maximum temperature) for 3 minutes. In some embodiments, the acceptable amount of time an asset could be exposed to the minimum or maximum temperatures 1213, 1214, respectively, could be dynamically adjusted depending on the rate of change in the environment. For example, the asset 1205 is exposed to a first temperature exceeding the maximum acceptable temperature, and then is exposed to a second temperature below the minimum acceptable temperature, the acceptable amount of time for the asset 1205 to be exposed to the second temperature may be adjusted (increased) because of the time already spent exposed to the first temperature. In some embodiments, the acceptable amount of time may depend on an internal temperature of the asset 1205.

In an embodiment, a user of the wireless sensing system manually specifies a temperature profile 1215 that is acceptable for assets (e.g., the acceptable temperature profile 1216; FIG. 12B). For example, an authorized user operating a client device (e.g., which may be substantially similar to the mobile gateway 810) manually inputs an acceptable temperature profile 1216 for various assets 1205(1)-(3) using an app on the client device, that is sent to the tape nodes 1210 and stored for reference. In one example, the manually inputted, acceptable temperature profile 1216 includes a minimum and maximum temperature (dashed lines FIG. 12B) and a duration that the asset may withstand the minimum and/or maximum temperatures. Other methods for determining acceptable temperature profiles 1216 for assets may be used without departing from the scope hereof.

In an embodiment, tape nodes 1210(1)-(3) adhered to assets 1205(1)-(3) during transport communicates to a gateway (e.g., mobile gateways 810, 812 and/or stationary gateway 814), server (e.g., server 804), or cloud (e.g., network 802) of the wireless sensing system (e.g., wireless sensing system 800) responsive to temperature exceeding the minimum or maximum temperature 1213, 1214, of the acceptable temperature profile 1216 for greater than a threshold period of time, as indicated by box 1217 in FIG. 12B. In one example of operation, tape node 1210(1) detects (e.g., by collecting temperature data) a temperature of 25° C. for 25 minutes, and transmits a notification or an alarm to the gateway to address the problematic temperature profile (as indicated by box 1217) soon (e.g., within 20 minutes). Upon detecting the problematic temperature displayed by box 1217, the tape node 1210(1) transmits a notification (alert) to a gateway (e.g., mobile gateway 810) operated by an authorized user handling the assets 1205(1)-(3). In some embodiments, the tape node 1210(1) transmits the notification to the client device, other tape nodes 1210(2), (3), and/or the server 804.

Depending on criteria (e.g., the severity of the environmental data exceeding the acceptable minimum or maximum 1213, 1214 threshold, the amount of risk involved in the asset 1205 becoming compromised, the needs of the customer, etc.), the tape node 1210(1) may prioritize transmitting the notification to the wireless sensing system 800 over battery life and immediately activate a cellular or satellite system to transmit the notification. In another example of the tape node 1210(1) transmitting the notification, the tape node 1210(1) may try to use the communication protocols it has available to it in an order of power efficiency. The frequency with which the tape node activates its wireless communication interfaces to transmit the notification may also be adjusted/prioritized based on the criteria.

In another example, the tape node 1210 detects that an asset 1205(1)-(3) has been experiencing a temperature of 25° C. for 40 minutes, and transmits an urgent notification/alarm or an alarm to the gateway to address the problematic temperature profile 1215 indicated by box 1217 (e.g., asset 1205A-5 will be permanently damaged within 5 minutes). The urgent alarm may be transmitted following a first alarm sent to the gateway that has not been addressed (e.g., by an authorized user). Actions that may be taken to address the problematic temperature profiles 1215 indicated by the temperature exceeding a threshold (box 1217) may include, for example, prioritizing delivery, loading, or unloading of an asset 1205(1)-(3), deviating from a planned delivery to maintain acceptable temperature profiles 1215(1) (e.g., placing an asset 1205(1)-(3) in a freezer to reduce temperatures prior to continuing delivery), marking an asset 1205(1)-(3) as undeliverable, and rearranging the order of delivering the assets 1205(1)-(3).

In some embodiments, the tape node 1210 processes the environmental data (e.g., temperature data) by comparing the temperature profile 1215(1) against the acceptable temperature profile 1216 to determine that a temperature is exceeding the minimum or maximum temperature (e.g., as shown by box 1217 in FIG. 12B) for a set amount of time (e.g., 20 minutes, an hour, etc.) transmits a result of the determination to a gateway, server, or cloud of the wireless sensing system. In other embodiments, the tape node 1210 transmits collected environmental (e.g., temperature) sensor data defining the temperature profile 1215 of the asset 1205(1)-(3) to a gateway, server, or cloud of the wireless sensing system. The gateway, server, or cloud of the wireless sensing system processes the sensor data to determine whether the surrounding environment 1200 is problematic for the asset 1205(1)-(3), and when problematic (e.g., as indicated by box 1217), transmits a notification or alarm to a user (e.g., a delivery driver) of the wireless sensing system. In other embodiments, the tape node 1210 processes the sensor data to determine when the temperature profile 1215 the asset 1205(1)-(3) is experiencing is problematic and transmits a notification or alarm to a user of the wireless sensing system (e.g., without connecting to a gateway, server, or cloud of the wireless sensing system).

In an embodiment, the tape node 1210 and/or the gateway sends a notification, and/or an alarm, indicating that the temperature profile 1215 is problematic to a client device (e.g., mobile gateway 810, operated by a user, or the mobile device 1305, FIG. 13) of the wireless sensing system (e.g., the wireless sensing system 800). For example, the client device may be a smart watch or wristband or a smart device having a graphical user interface. The notification and/or alarm identifies assets 1205(1)-(3) requiring attention or action, such as priority loading or unloading. The notification or alarm may also include information describing the asset 1205(1)-(3), such as a location of the asset (e.g., within a warehouse, delivery truck, etc.), an urgency level (e.g., in the form of color-coded tags, such that a red tag indicates that urgent action is required, yellow indicates that action is required but is not immediate, and green indicates an action may be required in the future), a duration (e.g., within 5 minutes, an hour, etc.) during which action should be taken to preserve integrity of the asset, and/or a specific environmental condition that is affecting the asset. In some embodiments, the client device may display a map indicative of the location of the asset, as discussed further below in FIG. 13.

In an embodiment, the tape node 1210 and/or the gateway may further, or instead of, communicate to other electronic devices of the wireless sensing system to provide a notification, and/or an alarm, to indicate that the temperature profiles 1215 is problematic to the asset 1205(1)-(3). For example, the tape node and/or the gateway directs a smart lightbulb of a wall circuit or outlet of a trailer, truck, room, refrigerator or freezer, or other location where the asset is stored, to flash a light to indicate that the temperature profile 1215(1) within the trailer, truck, room, refrigerator or freezer, or other storage area is problematic for the asset 1205(1)-(3). In another example, the tape node 1210 and/or the gateway directs an acoustic system to sound an alarm to indicate that the temperature profile 1215(1) is problematic for the asset 1205(1)-(3). In another example, the tape node 1210 and/or the gateway directs a wearable or portable electronic device to vibrate, emit a sound, or otherwise signal, a wearer of the portable electronic device to address the temperature profile that is problematic to the asset 1205(1)-(3). In some embodiments, the smart lightbulb may generate different color lights (e.g., green, yellow, red, etc.) to indicate the urgency of action, or may flash at different rates to indicate the urgency of action.

In other embodiments, the tape nodes 1210 adhered to assets 1205(1)-(3) may include one or more of an accelerometer, an optical sensor, or other sensors, for capturing events that may be problematic to the assets 1205(1)-(3). For example, a tape node 1210 adhered to an asset containing fragile items may include an accelerometer and determine, based on the accelerometer data, if the asset 1205(1)-(3) is handled roughly (e.g., thrown, shaken, dropped, etc.) during transportation. The tape node 1210 may include acceleration profiles that are acceptable to the asset 1205(1)-(3), determined by the machine learning model, and evaluate an acceleration profile generated from acceleration data captured by the accelerometer during transit of the asset 1205(1)-(3). In another example when the tape node 1210 is adhered to a light-sensitive asset 1205(1)-(3), the tape node 1210 may include an optical sensor and collect optical sensor data to generate an optical profile of the environment, and thereby determine whether the asset 1205(1)-(3) is exposed (e.g., opened when the tape node 1210 is within a container of the asset) to light during transportation that may damage the asset 1205(1)-(3). In other embodiments, the tape node 1210 may include additional or other sensors, including one or more of acoustic sensors, vibration sensors, humidity sensors, biometric sensors, and the like. These additional or other sensors may be used to determine when the asset 1205(1)-(3) is exposed to other problematic events, such as: high severity vibrations capable of damaging the asset 1205(1)-(3) or a container of the asset 1205(1)-(3); tampering with the asset 1205(1)-(3); high or low pressures affecting the asset 1205(1)-(3); and so on. In some embodiments, the tape nodes 1210 may generate multiple profiles 1215(1)-(3), where each tape node generates its own environmental profile 1215(4).

FIG. 12C shows a temperature profile 1215(1), a vibration profile 1215(2), a humidity profile 1215(3), and an environmental profile 1215(4), which is a collective of profiled 1215(1)-(3). Each tape node 1210(1)-(3) may have a single sensor (e.g., a temperature sensor, a vibration sensor, or a humidity sensor) and share their collected sensor data between themselves. One of the tape nodes 1210 may then generate the environmental profile 1215(4). The tape node 1210(1) with the temperature sensor may create the temperature profile 1215(1) for the other tape nodes 1210(2), (3), and determine, based on the type of asset 1205(2), (3) an acceptable temperature profile 1216 for the other tape nodes. In some embodiments, the tape node 1210(1) with the temperature sensor may retrieve acceptable temperature profiles 1216 of the tape nodes 1210(2), (3) from the other nodes 1210(2), (3). In some embodiments, when the asset 1205(1) that includes the temperature sensor is delivered, a gateway node (e.g., the mobile gateway 810, 812 or stationary gateway 814) may take over temperature data collection from the tape node 1210(1).

In some embodiments, each tape node 1210 may have all three sensors (e.g., a temperature sensor, a vibration sensor, and a humidity sensor) and generates the environmental profile 1215(4) themselves. In some embodiments, the tape nodes may have some combination of sensors and split responsibilities of creating each of the profiles 1215(1)-(4) amongst each other, depending on which sensors they have. In some embodiments, the tape nodes 1210(1)-(3) may have three sensors split amongst each other, and retrieve sensor data from a fourth sensor embedded within a gateway node (e.g., the mobile gateway 810, 812 or stationary gateway 814) of a delivery truck.

In some embodiments, temperature profiles 1215 captured by tape nodes 1210 1205(1)-(3) are used to determine a chain-of-events within the environment 1200, even when these events are not problematic. For example, the tape node 1210 may detect an increase in temperature when the asset 1205(1)-(3) is moved between locations from a holding fridge, through a warmer environment, to a reefer trailer, and a subsequently detected decrease in temperature may indicate the asset being deposited in a fridge at a second location. In another example, the temperature profile 1215(1) captured by the tape node 1210(1) of the asset 1205(1) may indicate a time of failure of other equipment (e.g., a refrigeration unit failing). In another example, the temperature profile 1215(1) captured by the tape node 1210(1) of asset 1205(1) indicates (approximate) shipping events, locations, and/or custody of the asset.

In some embodiments, the tape nodes 1210(1)-(3) communicate with each other to synchronously capture at least three types of environmental data (temperature, vibration, humidity, etc.) with low latency. Normally if the server has to individually instruct each tape node to start capturing data that is to be combined, as in the chart 1215(4), there will be latency due to the individual nodes 1210(1)-(3) needing to sync with the server 804 and start capturing the environmental data. Advantageously, the tape nodes 1210(1)-(3) establish a connection with each other over Bluetooth, and sync with each other. The impetus for connecting and synchronizing their sensing may be the initial onset of the temperature rising above the minimum or maximum acceptable temperatures 1213, 1214, respectively. A tape node 1210 with an embedded temperature sensor responds by contacting the other tape nodes 1210 and then coordinating them to perform the synchronous data capture, to ensure that the full environmental profile 1215(4) is captured with low latency or desynchronization of the three shown profiles 1215(1)-(3) curves (i.e., the three curves are accurately capturing the data points at the same time stamps, with less than millisecond precision). The collected environmental data is sampled (digital, not analog data) by having the tape nodes 1210(1)-(3) synchronize their sensor data capture, the actual data points may be captured at precisely the same time. In some cases, this may require the tape nodes 1210 (1)-(3) to synchronize their clocks (e.g., clocks 654, 654', 654"), or synchronize their clocks with a gateway (e.g., mobile gateway 810, 812 and/or stationary gateway 814) which provides a universal time (ground truth time).

Figure 13A:
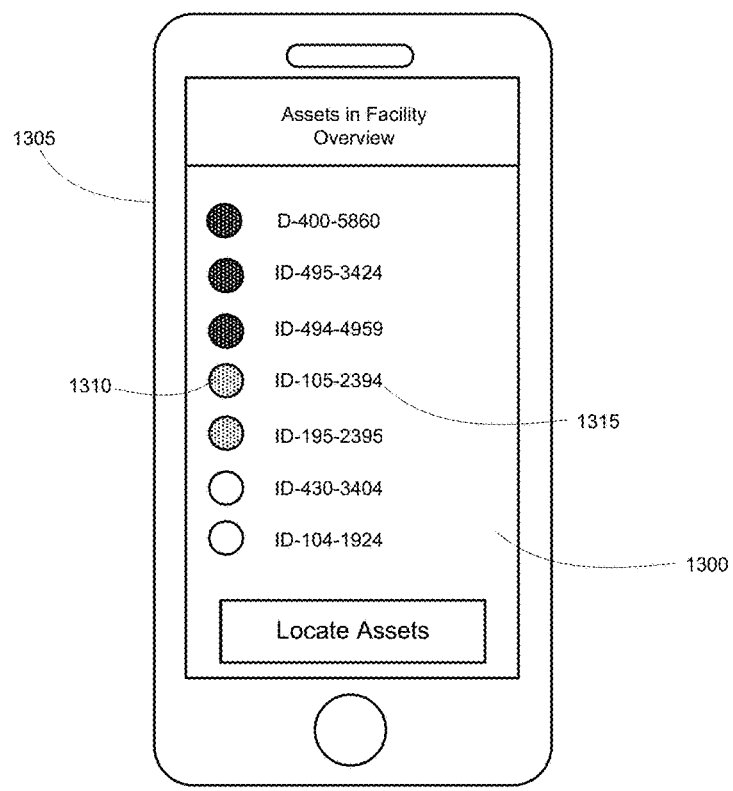
FIGS. 13A-B are schematic diagrams each illustrating a different example screenshot of a user interface depicting asset identifiers and tags for prioritizing loading and unloading of assets based on environmental profiles, according to an embodiment.
Figure 13B:
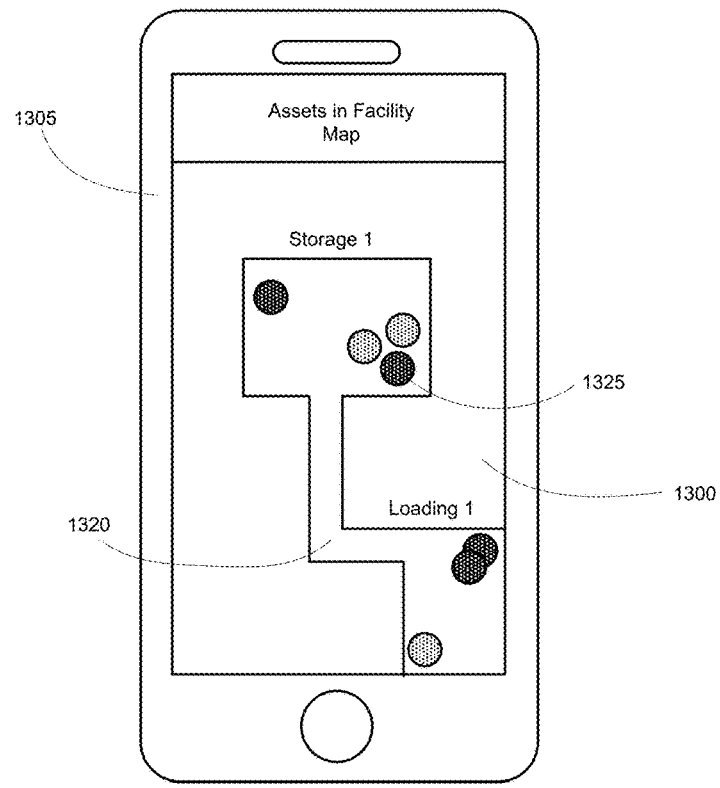

FIGS. 13A and 13B are schematic diagrams each illustrating a different example screenshot of a user interface of a mobile device 1305 depicting asset identifiers and tags for prioritizing loading and unloading of assets based on environmental profiles 1215(4) (or individual profiles 1215(1)-(3); FIG. 12C). FIGS. 13A-13B illustrate an example user interface 1300 of a mobile device 1305 (e.g., which may be substantially similar to mobile gateway 810) for displaying and/or inputting problematic events indicated by box 1207, acceptable profiles 1216, and/or profiles (e.g., profiles 1215 (1)-(4)). The user interface of the mobile device 1305 includes the tracking system 800 (e.g., client application 822 accessible by the client device) capable of displaying assets (e.g., the assets 1205(1)-(3)) experiencing problematic events indicated by box 1207 and/or profiles 1215(1)-(4). For example, when the mobile device 1305 is within communication range of the tape nodes 1210, the mobile device 1305 may receive a message from the tape nodes 1210. In some embodiments, the mobile device 1305 scans an identifier 122 on the tape node 1210 to initiate communication (e.g., pairing, syncing) with the tape node 1210. When communication between the mobile device 1305 and the tape node 1210 is established, the tape nodes 1210 may transmit collected environmental data (e.g., temperature sensor data), acceptable temperature profiles 1216, and/or generated temperature profile 1215(1), along with other information, such as location (e.g., GPS data), etc., to the mobile device 1305.

In the example of FIG. 13A, upon pairing, the user interface 1300 of the mobile device 1305 populates with tag 1310 and asset identifier 1315 pairs that represent the tape nodes 1210(1)-(3) and the assets 1205(1)-(3). In an embodiment, the user interface of the mobile device 1305 color-codes the tags 1310 to indicate a status of the corresponding asset based on urgency of any problematic events or profiles 1215(1)-(4) that are problematic for the assets 1205(1)-(3). For example, a green color tag in the user interface 1300 indicates the associated asset is not experiencing any problematic events and no action is required; a yellow color tag in the user interface 1300 indicates the associated asset is experiencing a mild problematic event and requires action; a red color tag in the user interface 1300 indicates the asset is experiencing a severe problematic event and requires immediate action. Any distinct labeling or tagging 1310 that differentiates levels of urgency for problematic events and profiles 1215(1)-(4) may be used without departing from the scope hereof. In an embodiment, the user interface may include an overview identifying one or more of: a number of assets requiring urgent action, a number of assets requiring non-urgent action, and a number of assets that do not require action.

Figure 14:
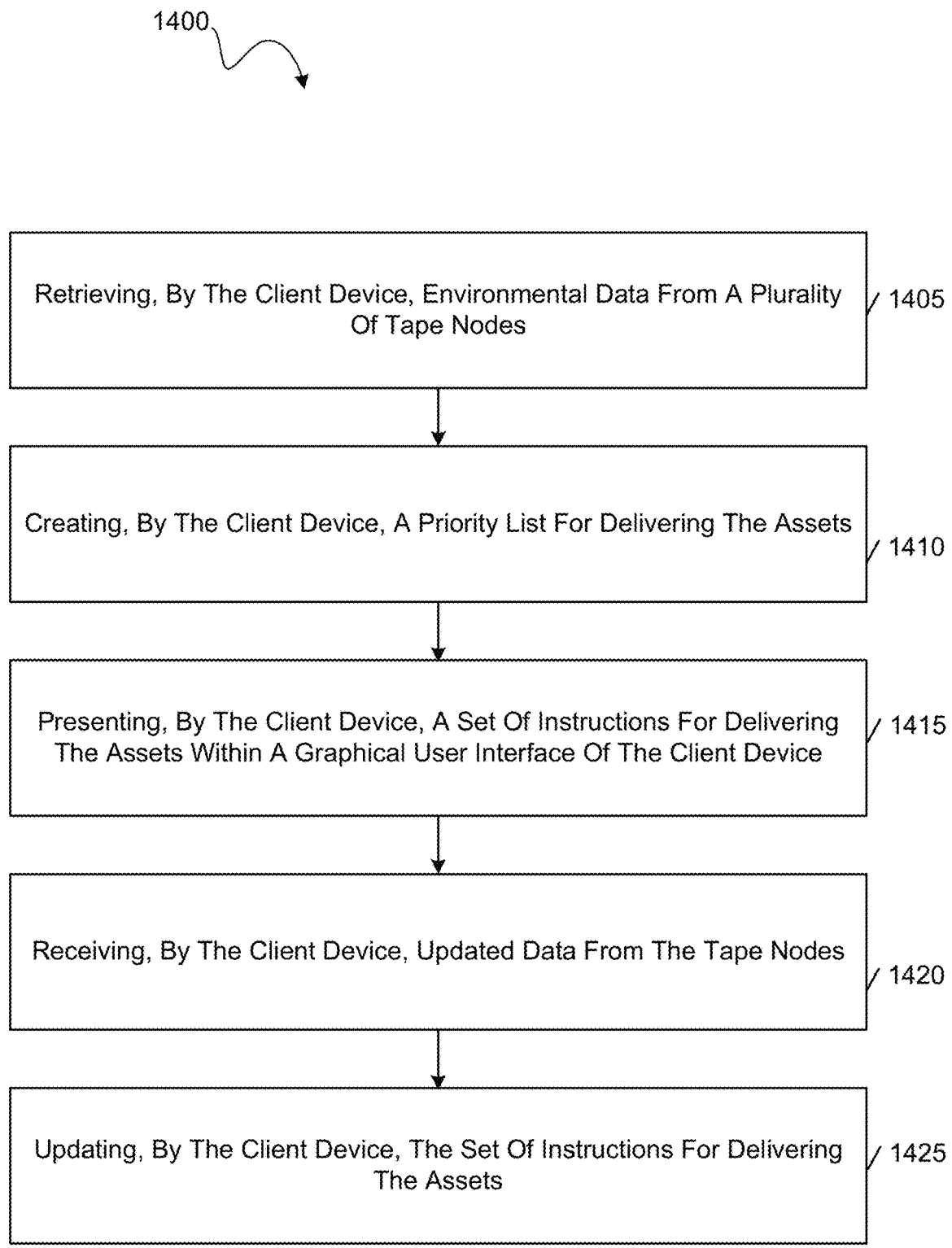
FIG. 14 is a flowchart illustrating one example method for generating and presenting a delivery schedule based on environmental profiles of assets with tape nodes, according to an embodiment.

In some embodiments, where environmental profile 1215 (4) generated by tape nodes 1210(1)-(3) indicates multiple different sensed profiles 1215(1)-(3) (e.g., temperature profile 1215(1), vibration profile 1215(2), humidity profile 1215(3), etc., as shown in FIG. 14), the color codes of the tags indicate which of the profiles 1215(1)-(4) causes the assets 1205(1)-(3) to require action. For example, an asset 1205(1)-(3) may have a red color tag 1310 in the user interface 1300 and corresponding multiple environmental profiles 1215(1)-(4): temperature profile, vibration profile, and humidity profile, are each displayable upon the user interface 1300 detecting user input on the user interface 1300 where the red color tag 1310 is located. The temperature profile 1215(1) of the asset 1205(1)-(3) is problematic, and the remaining profiles (vibration and humidity) are not problematic.

FIG. 13B shows a map 1320, generated by the user interface 1300 of the mobile device 1305 to show locations of the assets. In the example of FIG. 13B, the map 1320 depicts location and status of assets within a storage area and a loading area labelled "Storage 1" and "Loading 1". The mobile device 1305 communicates with a nearby gateway or node (e.g., the mobile gateways 810, 812, and stationary gateways 814) of the wireless sensing system (e.g., the wireless sensing system 800) to receive location information (e.g., GPS coordinates) describing the mapped area where the tape nodes 1210(1)-(3) are located. In other embodiments, the mobile device 1305 communicates with a satellite to receive location information describing the mapped area. The user interface 1300 displays a location of each tape node 1210(1)-(3) (and thus corresponding assets 1205(1)-(3)) on the map 1320 and indicate a corresponding status of the asset. As shown in the example of FIG. 13B, the map 1320 shows a plurality of tags 1325 that indicate both location and status of a corresponding asset 1205(1)-(3). For example, the tags 1325 have a color indicative of the urgency level of the corresponding asset, as described with respect to the tags 1310, FIG. 13A. Advantageously, the color of the tag 1310/1325 indicates the urgency for attention of the asset, allowing the operator to easily attend to the most urgent assets first.

In other embodiments, additional or different information may be included in the user interface 1300 of FIGS. 13A-B. For example, the user interface of FIG. 13A may display a location name in association with tags 1310 and asset identifiers 1315 (e.g., "Truck #49," "Loading Area 2"—not shown). In another example, the map interface of FIG. 13B may further display asset identifiers in association with the tags 1325. In another example, the map interface of FIG. 13B may be interactable to display asset identifiers in association with tags responsive to a user of the mobile device 1305 selecting a tag. In some embodiments, the client application 822 invokes the client device 1305 to provide additional information when a user clicks on the asset, including a current temperature, a type of the asset, a priority of the asset, a destination address, a tracking number, etc. In some embodiments, the user interface 1300 of the mobile device 1305 may further display a priority list or delivery order that lists assets 1205(1)-(3) experiencing problematic environmental profiles for immediate delivery, while assets 1205(1)-(3) that are not experiencing a problematic environmental profile are reordered for delivery. For example, the user interface of the mobile device 1305 displays instructions, "Please move assets 1205(1)-(3) experiencing problematic environmental profiles 1215 located within the "Storage 1" area to the "Loading 1" area; move assets 1205(1)-(3) not experiencing a problematic environmental profile 1215 within the "Loading 1" area to the "Storage 1" area."

In other embodiments, the mobile device 1305 interacts with the tape nodes 1210 associated with assets 1205(1)-(3) to determine whether a respective asset should be prioritized and/or marked as undeliverable. For example, responsive to a user of the mobile device 1305 pairing with the tape nodes 1210 by being (a) within communication range of, (b) hovering the mobile device 1305 over, or (c) scanning an identifier (e.g., identifier 122 of FIG. 1 such as a bar code, QR code, or other identifier), the tape node 1210 transmits information to the mobile device 1305 indicating one or more of: whether an action is required for the asset, an urgency of the action, an instruction to perform the action, and whether to prioritize an action for the asset.

In some embodiments, the client application 822 invokes the user interface 1300 to navigate the user to an at-risk asset 1205 for intervention. For example, the client application 822 may provide navigation to a delivery point or a refrigerator facility or wherever the next step is for the asset 1205 to ensure safe delivery. The navigation may include turn-by-turn instructions, real-time navigation guidance (like google maps navigation), indoor navigation guidance, augmented reality, for example. The navigation may include displaying a route for the user to take on the map 1300. In some embodiments, client application 822 navigates the user to an already compromised asset 1205 for disposal. The user may optionally inspect the asset 1205 to confirm that it has been compromised and shouldn't be delivered to the end-customer. The user may manually issue a new delivery, or the system (e.g., the wireless sensing system 800) may do so automatically after the user confirms, via the client application 822, that the compromised asset has been disposed.

FIG. 14 is a flowchart illustrating one example method 1400 for generating and presenting an asset delivery schedule. Method 1400 may apply to any form of delivery, such as air, sea, or ground. For ease of explanation, a delivery truck is used for the example of the method 1400; however, other forms of delivery including a plane, a train, a ship, etc., is within the scope of embodiments hereof. Method 1400 is implemented within a client device (e.g., mobile device 1305 of FIGS. 13A and 13B, mobile gateway 810 of FIG. 8, etc.). The client device retrieves (1405) environmental data (e.g., the profiles 1215(1)-(4), corresponding acceptable profiles 1216, collected environmental data, such as temperature data, humidity data, vibration data, as well as delivery data of the assets 1205, etc.) from a plurality of tape nodes (e.g., tape nodes 1210(1)-(3) of FIG. 12) adhered to assets (e.g., assets 1205(1)-(3)). For example, the client device 1305 retrieves the environmental data from the tape nodes 1210 after establishing a connection with the tape nodes 1210 by being within communication range thereof, hovering the mobile device 1305 over, or scanning an identifier 122 (e.g., a bar code, QR code, or other identifier) thereof. In some embodiments, the client device downloads the environmental data from the tape nodes.

In some embodiments, the client device may establish a connection with a gateway node (e.g., mobile gateway 810, 812; stationary gateway 814) proximate the tape nodes that has received and stored the profiles 1215(1)-(4) from the tape nodes 1210. The client device may establish a connection in a substantially similar manner as establishing a connection with the tape nodes. For example, when a delivery driver with a client device enters, or is within 10 feet of, a delivery truck, the client device establishes a connection with the mobile gateway 812 (e.g., adhered to the delivery truck). The client device may receive the environmental corresponding to the tape nodes from the gateway node. For example, the gateway node is within the delivery truck and receives environmental data from each tape node as the tape nodes adhered to assets are being loaded within the delivery truck.

Method 1400 further includes the client device creating (1410) a priority list for delivering the assets. For example, the client device may analyze the received environmental data to determine which assets require immediate delivery based on the profiles 1215, accepted profiles 1216, and the type of asset 1205 (e.g., the urgency of handling). In some embodiments, the client device may transmit the received data to a server 804 of the wireless sensing system 800, whereby the server 804 determines the priority list and sends the priority list to the client device 1305. Method 1400 further includes the client device presenting (1415), within a graphical user interface (e.g., graphical user interface 1300) of the client device, the priority list in the form of a set of instructions for delivering the assets. In some embodiments, the graphical user interface of the client device will populate with different color tags (e.g., tags 1310, 1325), asset identifiers (e.g., asset identifiers 1315, 1325), a location of the assets within an area (e.g., "Storage 1", "Loading 1"), etc., at least as illustrated in FIGS. 13A, B.

In some embodiments, method 1400 optionally includes the client device receiving (1420) updated data (new environmental data collected since the client device retrieved the environmental data) from the tape nodes. The client device may receive the updated environmental data in response to collected temperature exceeding a minimum or a maximum of the acceptable temperature profile (e.g., acceptable temperature profile 1216) for a set amount of time (as indicated by the box 1217). For example, when a cooling unit of the delivery truck shuts down (fails or is accidently turned off), as the temperature within the truck increases and becomes damaging to a temperature-sensitive asset therein, which requires urgent action to prevent damage to the asset. In some embodiments, the tape node 1210 transmits an alert to a sound system, a smart lightbulb, and/or a gateway that includes a display and/or sound system, to generate an audio or visual alert indicating that the asset is in a potentially damaging environment. In some embodiments, the tape node 1210 includes a display (e.g., an LED indicator) that changes colors based on the temperature being within an acceptable range. For example, the color is green when within the acceptable range, yellow when close to reaching a minimum or maximum acceptable temperature, and red when the temperature has exceeded an acceptable temperature.

The method 1400 optionally includes the client device updating (1425) the priority list (set of instructions for delivering the assets) based on the updated data. The client device may then update and display the updated set of instructions within the graphical user interface of the client device. For example, the updated set of instructions indicates the urgency of action required for the asset in the potentially damaging environment. In one example, the updated instructions include a rerouted delivery path to reduce the time the asset spends in the potentially damaging environment. In some embodiments, the updated set of instructions are generated to further include, based on the urgency of the action, the location of the asset and instructions that the driver checks the status of the asset (e.g., to move the asset to another location, to determine whether the asset is permanently damaged, etc.). The updated set of instructions may include instructions to remove/recycle the tape node and recycle the asset.

In some embodiments, method 1400 may apply to any environment of the asset, such as the storage facility, the truck, the final destination, etc. For example, rather than the location of assets being within a delivery truck and the priority list is for delivering assets to a final location, the assets are within a storage facility and the set of instructions includes which assets to load within a delivery truck.

Figure 15:
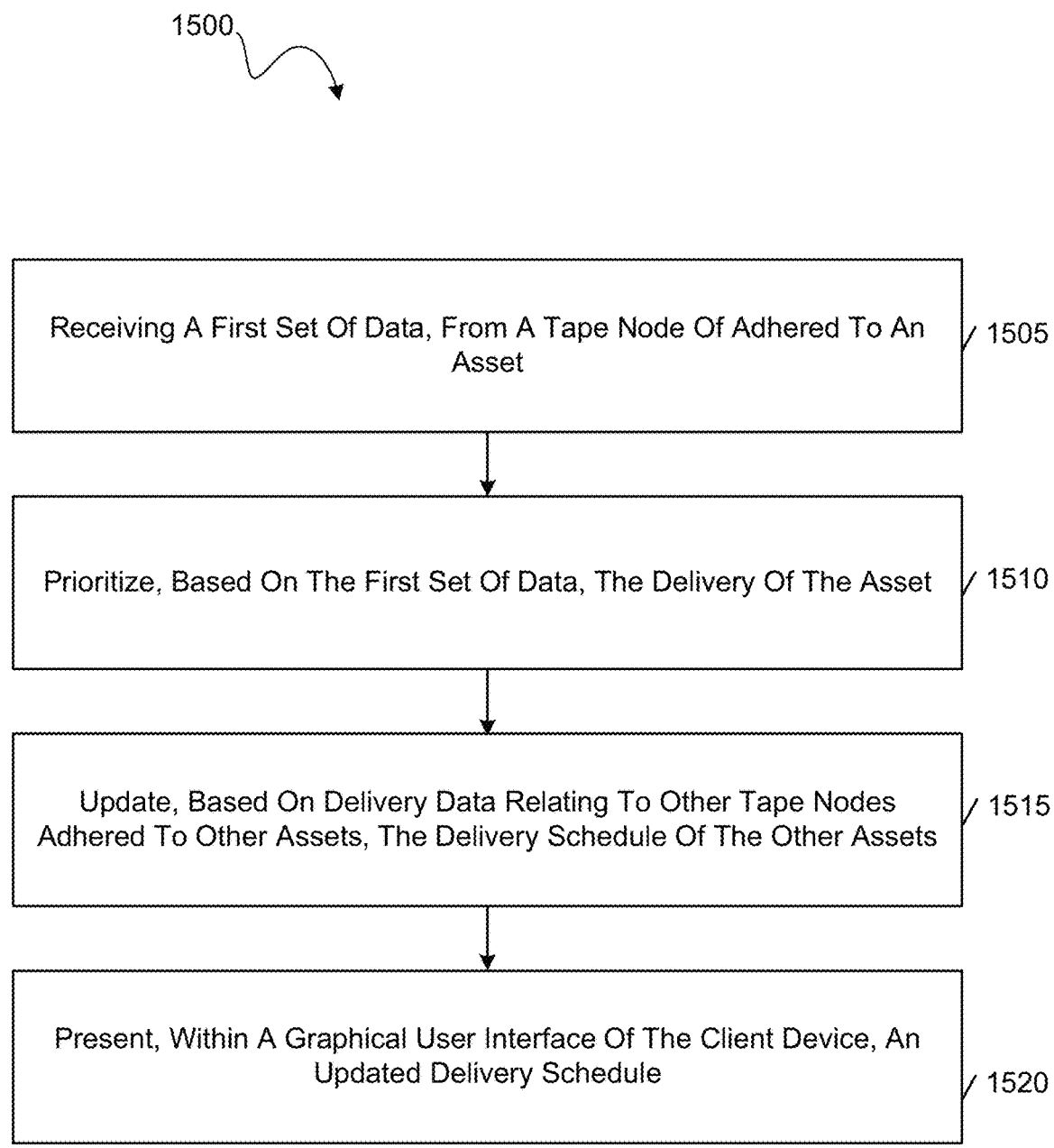
FIG. 15 is a flowchart illustrating one example method for prioritizing asset delivery for a plurality of assets with tape nodes attached thereto, according to an embodiment.

FIG. 15 is a flowchart illustrating one example method 1500 for prioritizing asset delivery for a plurality of assets with tape nodes attached thereto. Method 1500 includes the client device (e.g., a third-party smartphone or the mobile gateway 810) receiving (1505) a first set of data from a tape node (e.g., tape node 1210) adhered to an asset (e.g., asset 1205(1) of many assets 1205(1)-(3)). In one example of block 1505, a client application (e.g., client application 822) is running on the client device. In one example of block 1505, the tape node transmits the first set of data in response to an environmental threshold being exceeded, as discussed with reference to FIG. 12A-C. For example, the temperature exceeded the maximum acceptable temperature 1214 for more than the threshold amount of time and the asset is close to being compromised (e.g., the asset is medicine requiring cool storage).

Method 1500 further includes prioritizing (1510) the delivery of the asset. In one example of block 1510, the asset was scheduled for delivery in 5 stops and prioritizing includes delivering the asset at the next stop. In one example of block 1510, prioritizing includes determining a deadline of when the asset can safely be delivered, before being compromised, and delivering the asset before the deadline. In one example of 1510, the client application prioritizes the delivery. In another example of 1510, the client device transmits the first set of data to the server 804 of the wireless sensing system to determine a priority for the asset.

Method 1500 further includes updating (1515) the delivery schedule of other assets (e.g., assets 1205(2), (3)) based on delivery data relating to the other tape nodes (e.g., tape nodes 1210(2), (3)) adhered to the other assets. In one example of block 1515, the client application 822 or the server 804 reschedules the delivery of the other assets. In one example of block 1515, the rescheduling is based on route data for each delivery of the assets, the environmental profiles 1215 of each asset, etc. with constraints including time, staying within the environmental maximum and minimum acceptable thresholds, etc. Method 1500 further includes presenting (1520) the updated delivery schedule. In one example of block 1520, the updated delivery schedule is presented within a graphical user interface of the client device. In one example of block 1520, the updated delivery schedule is presented within a graphical user interface of an in-vehicle screen in communication with either the client device or the wireless sensing system 800.

Communication capability during a delivery route is essential when delivering an environmentally sensitive (e.g., temperature, humidity, vibration, etc.) asset (e.g., assets 1205(1)-(3)). For example, communications allow the wireless tracking system to notify a delivery driver when the environment of the asset is potentially damaging to the asset, and also allows the wireless sensing system (wireless sensing system 800) to notify users (e.g., the entity shipping the asset) of events affecting the asset. For example, a cold-chain asset, such as medicines, vaccines, etc., requires a cold environment during storage and transportation to prevent damage to the asset. Asset 1205(1)-(3) management (e.g., asset tracking and environmental monitoring to provide notification to take actions to maintain the asset is a non-damaging environment) is difficult when communication (e.g., cellular or other conventionally used methods of data communication) is poor. For example, storage facilities, airplane ramps, underground areas, and the like, typically have poor communication. When the assets 1205(1)-(3) and accompanying tape nodes 1210(1)-(3) enter poor communication environments, transmission of environmental data, collected by sensors embedded within the tape nodes, is frequently delayed until communication is reestablished. This poor communication increases the risk of damage to the asset due to unmonitored or delayed evaluation of the environmental conditions (e.g., temperature, humidity, vibration, etc.) in these areas. The longer the asset is in the damaging environment, the greater the potential damage to the asset, such as causing the asset to degrade, lose quality, contaminate, become unusable, or become undeliverable. In poor communication areas, this potential asset damage may not be reported and may not be corrected.

As described above, the wireless sensing system comprises one or more gateway nodes (e.g., mobile gateways 810, 812 and stationary gateway 814) and at least one tape node (e.g., the tape nodes 818, 824, 828, 832, 842-848, 859, 860, 1210(1)-(3), etc., with reference to FIGS. 8, 12) associated with an asset (e.g., asset 1205(1)-(3) of FIG. 12).

Tape nodes 1210(1)-(3), stationary gateway nodes 814 (e.g., stationed at a loading dock, shipping center, or other areas where assets 1205(1)-(3) are stored), or mobile gateways 810, 812 (e.g., the client device 1305; or a mobile gateway within a delivery vehicle, as discussed above) of the wireless sensing system (e.g., the wireless sensing system 800) transmit captured environmental data (e.g., via a cellular or satellite communication) to various, remote components of a wireless sensing system 800.

For example, a stationary gateway 814 or tape node 1210 in an area (e.g., loading dock, shipping center, or other areas where assets 1205(1)-(3) are stored) has sensors (e.g., temperature sensor, humidity sensor, vibration sensor, etc.) for measuring the relevant environmental conditions (e.g., temperature, humidity, vibration, etc.) associated with the risk for the asset 1205. If the stationary gateway 814 or tape node 1210 detects an environmental condition that is not suitable or is high risk for incoming assets 1205, the stationary gateway 814 may broadcast an alert for nearby wireless nodes. In some embodiments, it may send an alert to the server 804. For example, for temperature sensitive deliveries: An area where a shipment gets unloaded (loading/unloading dock, e.g.) may have a stationary gateway 814 or gateway tape stationed at the area that has a temperature sensor, and if it detects an unusually high temperature, it may alert nearby wireless nodes and/or the server 804 that temperature sensitive deliveries will be at risk. The alert may be transmitted to delivery drivers as soon as they reach the area that they need to move the assets 1205 quickly.

In some embodiments, tape nodes 1210 stationary gateway nodes 814, or mobile gateways 810, 812 of the wireless sensing system transmit the captured environmental data to server 804, cloud, or network 802. In certain scenarios, one of the tape nodes 1210, stationary gateway nodes 814, or the mobile gateways 810, 812 transmits the captured environmental data to a gateway node (e.g., segment 680 with high-power wireless-communication interface 682"), as described with reference to FIGS. 1-15. In certain scenarios, one or more of the tape nodes 1210, stationary gateway nodes 814, or mobile gateways 810, 812 perform one or more computations on the environmental data prior to transmitting the processed environmental data. For example, one or more of the tape nodes 1210, stationary gateway nodes 814, or mobile gateways 810, 812 determine whether the captured environmental data indicates that the environment is a high-risk environment for the asset (e.g., a high-temperature risk for a cold chain asset; high light-risk for a light-sensitive asset; etc.), which may result in a temperature exceeding an acceptable temperature indicated by box 1217. For example, the tape nodes 1210, stationary gateway nodes 814, or mobile gateways 810, 812 may process the environmental data to generate the profiles 1215(1)-(4), as discussed with reference to FIGS. 12-14, among other computations.

The database of the wireless sensing system 800 may store locations along a path of travel that are associated with high-risk environments. For example, based on historical data from previous tape nodes that traveled through an area, the database of the wireless sensing system 800 may keep a log of areas that were previously reported as high-risk environments. The wireless sensing system 800 may build up a database on the server 804 of high-risk environments that were previously logged. For example, locations that have a high number of past reports of high-risk conditions from tape nodes 1210 may be classified as high-risk environments. There may be a threshold number of historical reports in a given area or a geofenced area for determining if it is a high-risk environment. A portion of the database of the server 804 may be downloaded onto the tape node 1210 local memory (e.g., memory 658, 658', 658"). The portion of the database may correspond to a proximity to the current location of the tape node 1210 or to an expected path that the tape node 1210 will take while in transit. When the tape node 1210 detects its own location is within one of these high-risk areas (based on own location and geofence associated with high-risk environment), it may determine that it is in the high-risk environment.

Another factor for high-risk environments may be network coverage. If there is a low number of gateway nodes (e.g., mobile gateways 810, 810 and/or stationary gateways 814) for the asset tape node 1210 to establish communication with, the risk factor within a high-risk environment may be elevated based on that. Low coverage, extended areas where infrastructure is sparse, may naturally correspond to areas where the assets are at risk of being compromised or damaged. Additionally, the temperature profile 1215(1) as the asset 1205 travels through different areas may be used to assess the risk. For example, in a standard delivery, the temperature of an asset 1205 typically rises by 3 degrees Celsius during the drive from facility A to facility B. If the wireless sensing system 800 detects that a current shipment or asset 1205 has its temperature rise by 6 degrees (or some other anomalous rise or fall of the temperature), it may determine there is a high risk. The temperature profiles 1215 may be modeled for the journey, and, in some embodiments, a machine learning model may be used to predict the upcoming risk based on historical temperature sensing data.

In environments without cellular reception, it is valuable for tape nodes 1210, stationary gateway nodes 814, or mobile gateways 810, 812 of the wireless sensing system to continue to capture and transmit sensor data. High-risk conditions for assets may damage, degrade, or cause the asset to become undeliverable. As such, it is important to have real-time data to identify high-risk conditions such that users of the wireless sensing system are able to interfere or perform actions to correct conditions of the asset. For example, high-risk conditions may include one or more of the following: high or low temperatures; high or low pressures; high vibrations; light, water, or other factors that may impact the quality of an asset. Actions that may be performed by users of the wireless sensing system may include prioritizing loading or unloading of an asset experiencing a high-risk condition; deviating from a planned course of action to regulate conditions of an asset; prioritizing delivery of an asset experiencing high risk conditions; marking an asset as undeliverable; performing repairs to an asset or to machinery responsible for conditions of an asset (e.g., a refrigeration unit); and the like, including the actions described above with reference to FIGS. 12-14.

In order to maintain real-time sensor data, tape nodes 1210 stationary gateway nodes 814, or mobile gateways 810, 812 of the wireless sensing system are configured to identify a loss of cellular reception at a particular location (e.g., in advance of a transport route) and attempt establishing communications connections via a series of other communications methods. In some embodiments, tape nodes 1210 stationary gateway nodes 814, or mobile gateways 810, 812 are configured to attempt using communications methods in order of power efficiency, e.g., if cellular is down, then Bluetooth, LoRa, and satellite are sequentially used to preserve power. In other embodiments, the nodes may attempt to use other or additional communications methods, e.g., based on communications capabilities of an individual node (e.g., by attempting to use the communication components embedded within the node: low, medium, high-power wireless-communication interfaces 652, 672', 682"). In some embodiments, nodes of the wireless sensing system are operable to activate at periodic intervals to attempt establishing communications connections if one is unable to be established after an initial attempt. When a communications connection is established, nodes of the wireless sensing system are operable to transmit sensor data via the new communications connection.

In an embodiment, the wireless sensing system predicts areas of low cellular reception. Where it is predicted that there is low cellular reception, the wireless sensing system 800 may issue or deploy a gateway node (e.g., mobile gateway 812, stationary gateway 814, deployed gateway 1602, discussed below) in the area (e.g., ship a gateway with the appropriate wireless radios to the area, have someone install it and initialize it once it arrives, etc.), ahead of a sensitive tape node 1210 reaching that area. Also, when the tape nodes 1210 are about to reach the area, the tape nodes 1210 may reference local memory (e.g., memory 658, 658', 658") or the database of the server 804, to determine the area has poor cellular reception, so the tape nodes 1210 can automatically search for a gateway node using alternative wireless protocol (Bluetooth, BLE, LoRa, etc.) when the tape nodes 1210 arrive. For example, the tape node 1210 could have mapping/location data corresponding to the geofenced area downloaded and stored onto its local memory.

In some embodiments, the wireless sensing system 800 may similarly ship and deploy a gateway in the area where there is likely a high-temperature area, to supplement existing wireless coverage (e.g., if there are no gateways or not enough gateways already installed within the area). Because this may be a critical area for the transit of the temperature sensitive assets 1210, the wireless sensing system 800 may analyze existing infrastructure within the area and supplement the existing infrastructure with gateway nodes to ensure that the tape nodes 1210 travel through the area without any loss of connectivity.

In some cases, areas (e.g., airplane loading ramps, etc., where the asset or parcel may be likely without refrigeration) where there is high risk of high temperature or heat exposure to assets 1205 may be correlated with areas of low cellular reception. In some embodiments, a machine learning model (e.g., a classifier or neural network) may be trained to identify based on historical temperature/weather data, if the inputted temperature/weather data correlates to an area of low cellular data. If it's determined, based on historical data, that the asset 1205 is in a path that intercepts an area where there is high temperature exposure, there may be a correlation with low-cellular reception. The wireless sensing system 800 may respond by deploying a gateway in that area to patch the wireless coverage gap (by adding LoRa, LoRaWAN, Satellite, Bluetooth, WiFi, WiFi-direct, etc.).

Similarly, if the tape node 1210 detects a higher-than-normal ambient temperature, or detects it's in one of these areas of predicted high temp exposure and low-cellular reception, it may automatically search for a gateway instead of trying to connect In such a case, the tape node 1210 may prepare itself for also being in an area of low-cellular reception, as a precautionary measure. In some embodiments, nodes (e.g., tape nodes 1210, mobile gateway 810, 812, stationary gateway 814, etc.) of the wireless sensing system 800 apply a machine learned model to captured environmental data (e.g., a record stored within, e.g., database 800, FIG. 8, of the location along a travel route where nodes lost cellular reception); the machine learned model is trained to output a likelihood of loss of cellular reception at particular locations along a route of travel. Machine learned models may be trained using historical and third-party data sets, and may learn to identify locations that commonly lack cellular reception, such as storage facilities, airplane ramps, underground areas, etc. In some embodiments, aspects of the machine learned models may be stored within and applied by tape nodes 1210, stationary gateway nodes 814, or mobile gateways 810, 812 of the wireless sensing system. In other embodiments, aspects of the machine learned model may be distributed among a plurality of nodes of the wireless sensing system 800, and applying the model is performed by communicating between the various tape nodes 1210 stationary gateway nodes 814, or mobile gateways 810, 812. In other embodiments, aspects of the machine learned model may be stored and applied in a server 804, cloud, or other infrastructure of the wireless sensing system 800.

In an embodiment, gateway nodes (stationary gateway nodes 814, or mobile gateways 810, 812) of the wireless sensing system are deployed at locations corresponding to a predicted loss of cellular reception, as described by the following U.S. Patent Application: U.S. patent application Ser. No. 16/822,932, incorporated herein in its entirety. As described in patent application Ser. No. 16/822,932, gateway nodes may be deployed to areas of low cellular reception by sending them to a physical premise. For example, airplane ramps commonly lacking cellular reception may have one or more stationary gateway nodes deployed (e.g., adhered to infrastructure of the airplane ramps) within low-range communications distance of tape nodes and mobile gateways transported through the airplane ramps. In another example, storage facilities having metal walls predicted to compromise cellular reception may have one or more gateway nodes deployed throughout the storage facility to enable tape nodes and mobile gateways within the storage facility to establish communications. In another example, assets having destinations or in-transit locations predicted to be low reception environments may include a black tape node, such as a stationary gateway (e.g., using medium or high-power wireless-communications interface 672', 672", 682"; FIG. 6A-C) or gateway node such that other assets having white tape nodes (e.g., using low-power wireless-communications interface 652; FIG. 6A-C) may use the black tape node or gateway node as an intermediary for longer-range communications.

Figure 16:
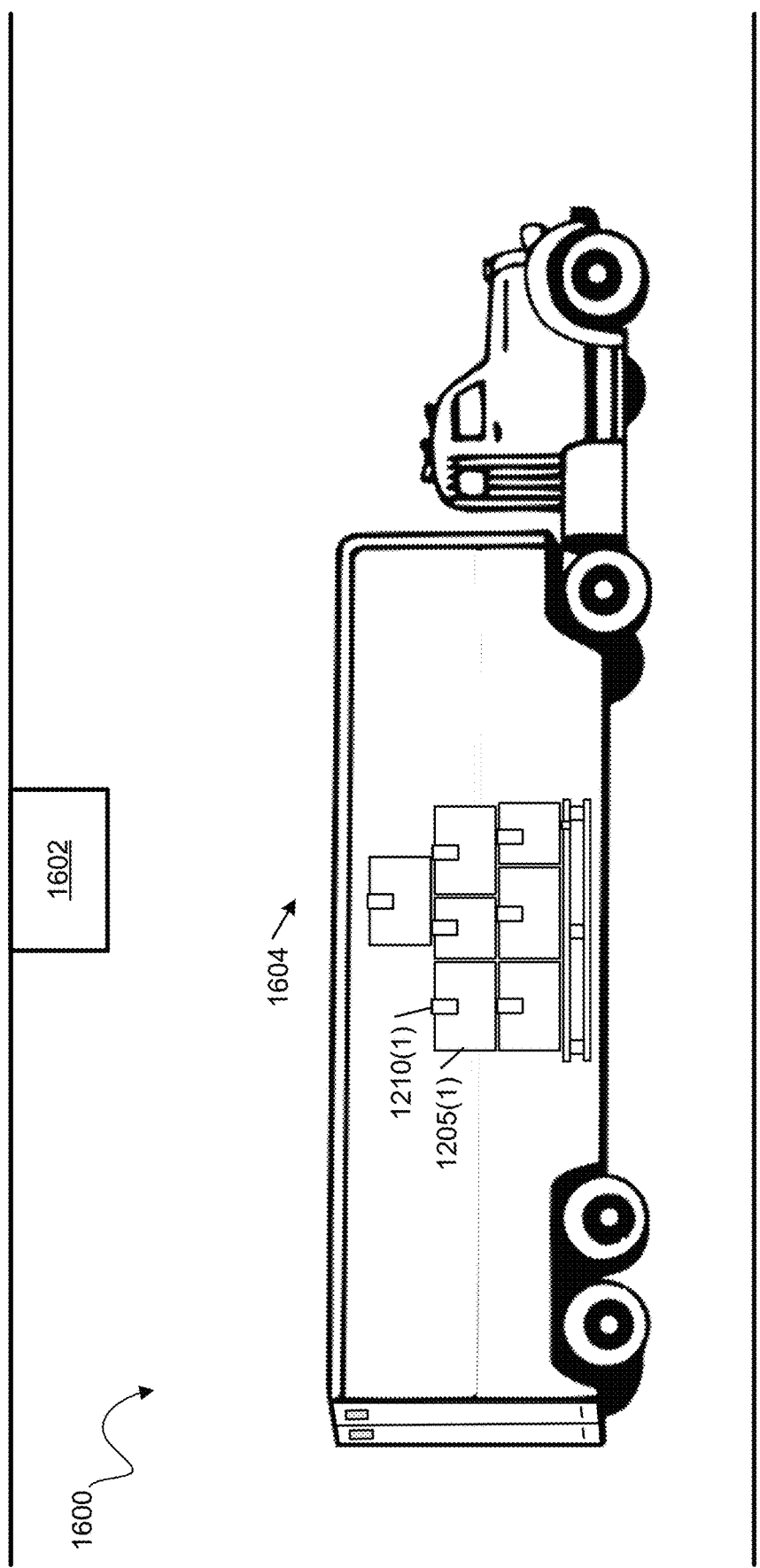
FIG. 16 illustrates an example environment where the gateway node is installed near a low-cellular reception area for supplementing a loss of wireless coverage, according to an embodiment.

FIG. 16 illustrates an example environment where the gateway node is installed near a low-cellular reception area 1600 (e.g., an airplane ramp, a parking structure, etc.) for supplementing/patching a loss of wireless coverage. In embodiments, the tape node 1210(1) attached to the asset 1205(1) is equipped with a cellular communication system (2G, 3G, 4G, 5G, etc.) for reporting sensor data and detected events to the server 804 of the wireless sensing system 800. When the tape node 1210(1) loses cellular coverage, e.g., upon entering the area 1600, the tape node 1210(1) alternatively searches for the gateway node 1602, so that it doesn't lose the ability to report sensor data or have real-time tracking of the environmental data. In some embodiments, the loss of cellular reception may have been predicted based on machine learned models analyzing historical data and the gateway may have been deployed to the area 1600 in advance of the truck 1604 entering the area 1600 with the asset 1205(1), as discussed with reference to FIG. 17. The deployed gateway 1602 may have an adhesive tape platform and may be adhered to a wall or ceiling of infrastructure of the area 1600. In some embodiments, the 1602 can be pluggable to an outlet of infrastructure of the area 1600 for a permanent power source.

Figure 17:
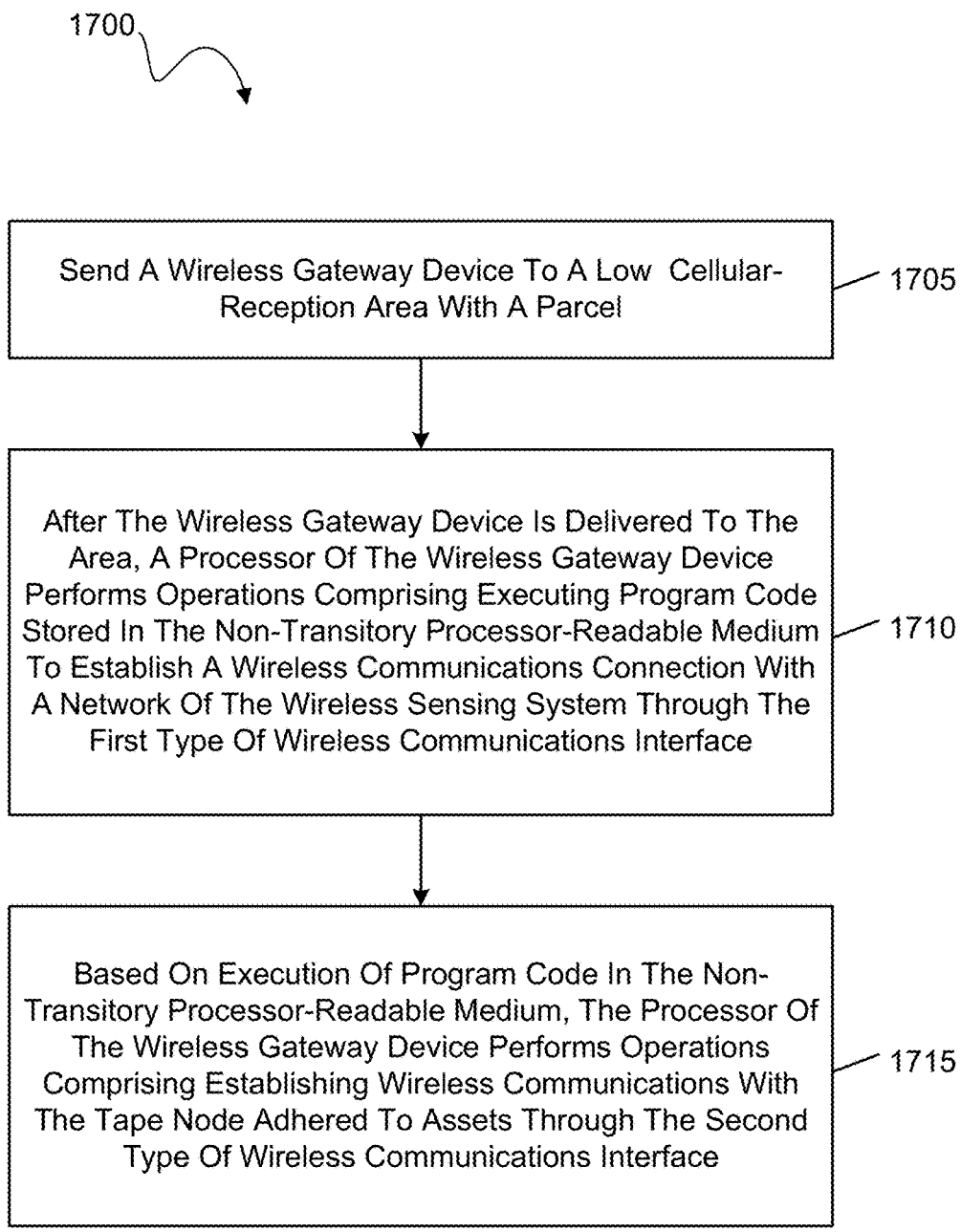
FIG. 17 is a flowchart illustrating one example method of deploying a gateway to an area with low-cellular reception, according to an embodiment.

FIG. 17 is a flowchart illustrating one example method 1700 of deploying a gateway (e.g., deployed gateway 1502, which may be a mobile gateway 812 or stationary gateway 814) to an area (e.g., area 1600) with low-cellular reception. The wireless sensing system 800 sends (1705) a wireless gateway device (e.g., deployed gateway 1602, a mobile gateway 812, stationary gateway 814, and/or a tape node) to the low-cellular reception area. In some embodiments, the deployed gateway 1602 includes a first type of wireless communications interface (e.g., a medium or long range communications interface, such as LoRaWAN and/or a cellular communications interface), a second type of wireless communications interface (e.g., a short-range communications interface, such as Bluetooth LE), a processor coupled to the first type of wireless communications interface, and an energy source coupled to the processor, the first and second types of wireless communications interfaces, and a non-transitory processor-readable medium comprising processor-readable program code.

In some examples, the gateway 1600 is deployed (e.g., delivered by a parcel delivery service) to the low-cellular reception area to serve as a transient low-cost gateway that communicates wirelessly with the tape nodes 1210 and the wireless sensing system 800 (e.g., the network 802). The gateway 1602 typically is sent to the area before the assets 1205 and the tape nodes 1210 are scheduled to arrive at the area. In some embodiments, the network 802 may configure the gateway to send messages to and receive messages from the tape nodes 1210 over the network 802. In some embodiments, the deployed gateway 1602 is configured to process data and detect and respond to defined events (e.g., environmental data exceeding the minimal or maximum acceptable thresholds, e.g., as described with reference 12A-C). The deployed gateway may be programmed or re-programmed with operating instructions by the network 802 of the wireless sensing system 800 before and/or after arriving at the low-cellular reception area 1600.

In some embodiments, the wireless sensing system 800 ships the deployed gateway to the area using a conventional shipping carrier (e.g., US Postal Service, Federal Express, United Parcel Service, and DHL Express). The deployed gateway 1602 may be shipped to the area in a conventional envelope or box along with printed instructions to keep the deployed gateway in the low-cellular reception area 1600 (e.g., in a mailroom holding cage, a manager's office, or some other place on the physical premises where it will not be lost, stolen, damaged, or otherwise become unavailable). In some examples, the printed instructions additionally indicate that the deployed gateway 1602 should be located within a prescribed wireless communications range of the asset 1205 receiving, holding, or processing area in the area so that the deployed gateway 1602 can wirelessly scan and identify parcels associated with network 802 and report the presence, condition, and status of the parcels to the network 802.

Method 1700 further includes the processor of the deployed gateway 1602 to perform (1710) operations comprising executing program code stored in the non-transitory processor-readable medium to establish a wireless communications connection with the network service 802 through the first type of wireless communications interface. In one example of block 1710, the deployed gateway is activated (i.e., configured to draw electrical power from an internal power source) before being shipped. In one example of block 1710, the deployed gateway is shipped in an unpowered state and includes printed instructions for activating the deployed gateway. In another example of block 1710, more than one gateway is deployed to the area. Once activated, the deployed gateway 1602 periodically monitors its geographic location to determine when it has arrived at the programmed destination. For example, the deployed gateway checks its GPS coordinates according to a programmed schedule (e.g., once per hour or once per day). After the deployed gateway determines that it has arrived (e.g., that its GPS coordinates are within the boundaries of the area), the deployed gateway 1602 attempts to communicate with the network 802.

After establishing a communication connection with the network service 802, the deployed gateway 1602 transmits to the network service 802 a unique identifier (ID), GPS location coordinates, battery level, and other relevant data (e.g., event data and sensor data) of the deployed gateway. One or more of the applications 806 running on the server(s) 804 of the network service 802 are configured to receive and process the data transmitted by the deployed gateway. The processed data is then stored in the database of the server 804 and associated with a particular account associated with the low-cellular reception area. The network service 802 also is configured to send to the deployed gateway new or updated program instructions, configuration parameters, security protocols, and tape node information (e.g., identifiers of the peripheral tape nodes that are expected to arrive at the low-cellular reception area).

After the deployed gateway 1602 has reported its current status to the network service 802, the deployed gateway awaits the arrival of the expected assets 1205 carrying tape nodes 1210 associated with the network service 802.

Based on execution of program code in the non-transitory processor-readable medium, the processor of the deployed gateway 1602 performs (1715) operations comprising establishing wireless communications connections with the tape nodes (e.g., tape node 1210 as they enter the area) and gateway devices in the low-cellular reception area through the second type of wireless communications interface. In some embodiments, the deployed gateway 1602 is configured to broadcast ping packets into the low-cellular reception area according to a heartbeat protocol. The ping packets may be identified and processed by tape nodes 1210. When the tape nodes 1210 are within the transmission range of the deployed gateway, they may receive the ping packets transmitted by the deployed gateway. In one example of block 1715, the tape nodes 1210 are programmed to respond to the receipt of a ping packet by sending a response packet to the deployed gateway 1602. After receiving a response packet from a tape node 1210, the deployed gateway 1602 may pair (i.e., establish a wireless connection) with the tape node 1210 to transmit or receive, for example, sensor data, control data, status data, or application data.

Figure 18:
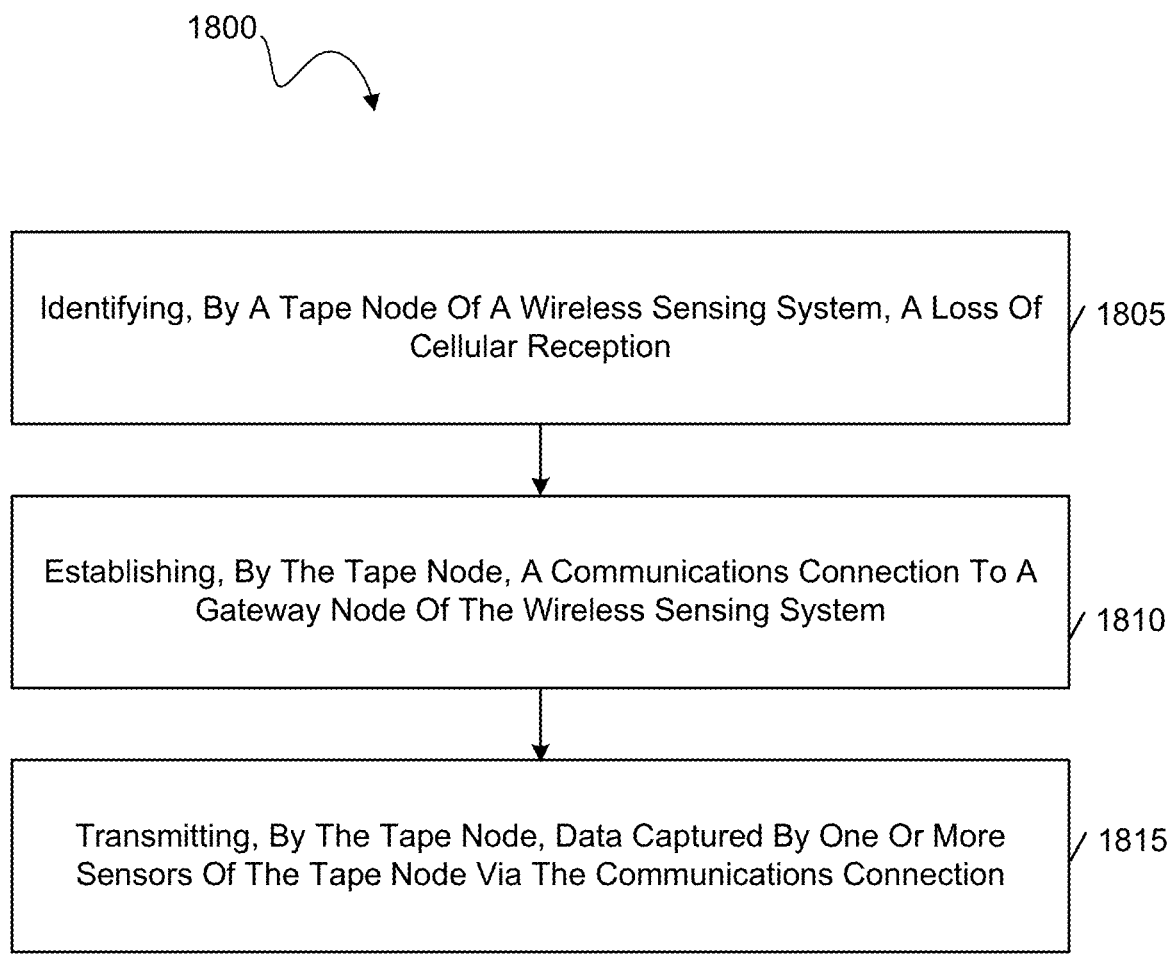
FIG. 18 is a flowchart illustrating one example method for identifying areas with low cellular reception and establishing communication between nodes for during transit through the identified areas, according to an embodiment.

FIG. 18 is a flow diagram of a method 1800 for capturing and transmitting environmental data in low reception environments. Method 1800 includes a node (e.g., tape nodes 1210, 818, 824, 828, 832, 842-848, 859, 860, etc.; the mobile gateways 810, 812; stationary gateway 814; etc.) of a wireless sensing system identifying (1805) a loss of cellular reception. In some embodiments, the nodes identify the loss of cellular reception, as described above. For example, the node may identify the loss of reception based on using the machine learning model, or other techniques and factors, as discussed above. For example, the nodes may each distribute the identification by sharing computation workload to each compute aspects, e.g., a stationary gateway node analyzes historical environmental data and/or structures (e.g., concrete storage facilities, parking ramps or garages, etc.) along a travel route that may have poor cellular reception, and a mobile gateway node analyzes the contents of the assets, etc., to determine if the contents are sensitive to environmental conditions.

The method 1800 further includes the node establishing (1810) a communications connection to a gateway node of the wireless sensing system, in response to identifying the loss of cellular reception. For example, the communications connection is established via Bluetooth, LoRa, satellite, or other communications methods. In some embodiments, a current algorithm for establishing the backup connection is to wake up the tape node 1210 at intervals to search for an available connection with a gateway or other tape node that can assist with the data relay. When the tape node 1210 searches, it tries every wireless communication protocol (e.g., in order of 1. Bluetooth 2. LoRa/LoRaWAN, 3. Satellite, etc.) it is equipped for in order of power efficiency.

In some embodiments, the node may be substantially similar to the tape node establishing a connection with the client device (as described in FIGS. 13, 14). In some embodiments, a stationary gateway (e.g., the stationary gateway 814, deployed gateway 1602, etc.) may be in fixed locations affixed to infrastructure of a, e.g., shipping center, airplane ramp, and/or other locations (e.g., area 1600) where the nodes have identified low cellular reception, as described above, and/or plugged into power outlets (or drawing from other fixed resources in an environment) to detect a location of users with mobile phones (e.g., client device 1305, and/or a mobile gateway 810 with a client application 822). For example, the mobile phones are beaconing to dispatch users in the proximity of a temperature-sensitive package. Method 1800 further includes the node transmitting (1815) environmental data captured by one or more sensors of the tape node via the communications connection.

In some embodiments, after captured environmental data is transmitted, the gateway (e.g., stationary gateway 814, deployed gateway 1602, etc.) relays the captured environmental data using a non-cellular communication method (e.g., via LoRa to another LoRa-compatible gateway or tape node) to a second wireless node (e.g., a mobile or stationary gateway or a tape node) that is in a second area with good cell reception or internet connectivity. The second wireless node then uploads the data to the server 804 using cellular or internet connectivity.

In some embodiments, the gateway uploads the data to the server 804 directly via satellite connection, after it receives the data from the tape node 1210. For example, the server 804 may be prepared to receive the captured environmental data for the asset 1205 from a different node than the tape node 1210 attached to the particular asset 1205. For example, the gateway, when relaying the captured environmental data, on behalf of the asset tape node 1210 in the low cell environment, may send the captured environmental data along with an identifier for the tape node 1210 or the asset 1205, along with timestamps and a flag that is associated with cell-reception loss. Thus, the server 804 is aware that cell reception can be lost, and the server 804 is able to maintain real-time tracking by receiving the captured environmental data relayed from the gateway and continue logging data from where the tape node 1210 left off before entering the low-cellular reception area. The server 804 may ping gateways near a last known location of the asset 1210, when cellular reception is lost, to prompt the gateways to search for the asset 1205 and establish the backup connection.

In another example of method 1800, in some embodiments, a delivery driver is entering a parking structure of a shipping facility; there are a plurality of tape nodes 1210 adhered to corresponding assets 1205(1)-(3) within the delivery truck. A deployed gateway (e.g., stationary gateway 814, deployed gateway 1602, etc.) is affixed to infrastructure of the parking structure, where one low cellular reception has been identified by one of the tape nodes (e.g., tape nodes 1210, 818, 824, 828, 832, 842-848, 859, 860, etc.; the mobile gateways 810, 812; stationary gateway 814; etc.). The deployed gateway may search (e.g., in response to referencing a shipping manifest and determining there is an incoming shipment) for the tape nodes 1210 and/or mobile phones (e.g., client device 1305, and/or a mobile gateway 810 with a client application 822) within a proximity of the deployed gateway, and then detect nearby nodes and mobile phones. The deployed gateway may receive, from a tape node, a signal that indicates a problematic environmental profile 1215 of a corresponding asset 1205(1)-(3). Upon receiving the problematic environmental profile of the corresponding asset 1205(1)-(3), the stationary gateway may transmit a signal, or relay the received environmental profile 1215, to the detected mobile phones of users, who may be dispatched to take corrective action concerning the assets showing the problematic environmental profile 1215.

Figure 19:
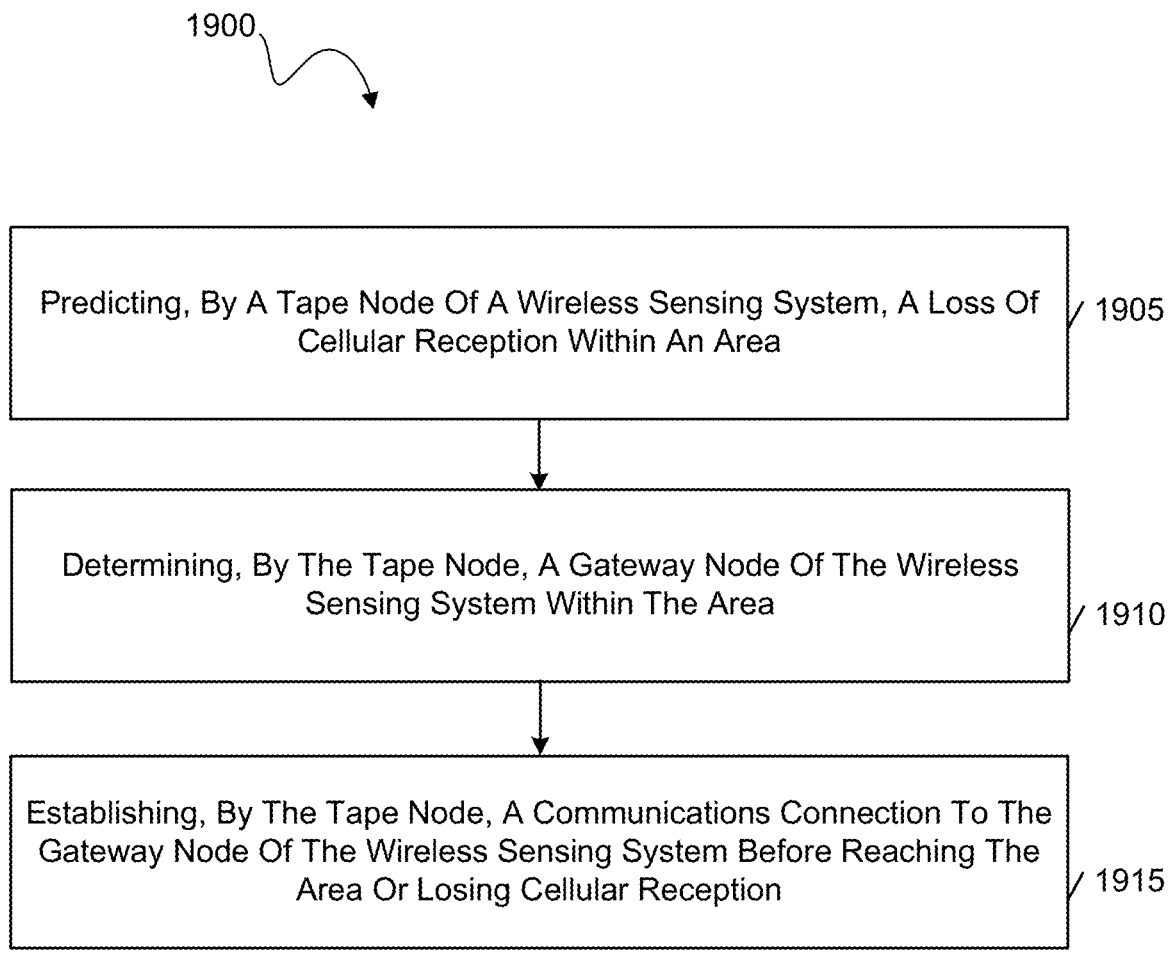
FIG. 19 is a flowchart illustrating one example method for predicting areas with low cellular reception and establishing communication between nodes before entering the predicted areas, according to an embodiment.

FIG. 19 is a flow diagram of a method 1900 of a tape node predicting a loss of cellular reception within an area. Method 1900 includes a node (e.g., tape nodes 1210, 818, 824, 828, 832, 842-848, 859, 860, etc.; the mobile gateways 810, 812; stationary gateway 814; etc.) of a wireless sensing system predicting (1905) a loss of cellular reception. In some embodiments, the nodes predict the loss of cellular reception, as described above. For example, the node may predict the loss of reception based on using the machine learning model, or other techniques and factors, as discussed above. For example, the nodes may each distribute the computation of the prediction by sharing computation workload to each compute aspects, e.g., a stationary gateway node analyzes historical environmental data and/or structures (e.g., concrete storage facilities, parking ramps or garages, etc.) along a travel route that may have poor cellular reception, a mobile gateway node analyzes the contents of the assets, etc., to determine if the contents are sensitive to environmental conditions, and the tape node identifies an area (e.g., area 1600) associated with a loss of cellular reception.

Method 1900 further includes the tape node determining (1910) a gateway node (e.g., deployed gateway 1602, mobile gateway 810, 812, and/or stationary gateway 814) within the area. In one example of block 1910, the tape node requests the server 804 to locate, within the database of the server 804, a location of gateway nodes within the area. In one example of block 1910, the tape node (or any node within a proximity, e.g., within a delivery vehicle 1604) sends a ping to the predicted area for gateways within the predicted area to respond. Method 1900 further includes the tape node establishing (1915) a communications connection to the determined gateway within the area before entering the area. For example, the communications connection is established via Bluetooth, LoRa, satellite, or other communications methods. In some embodiments, a current algorithm for establishing the backup connection is to wake up the tape node 1210 at intervals to search for an available connection with a gateway or other tape node that can assist with the data relay. When the tape node 1210 searches, it tries every wireless communication protocol (e.g., in order of 1. Bluetooth 2. LoRa/LoRaWAN, 3. Satellite, etc.) it is equipped for in order of power efficiency. Establishing the connection before entering the area may be based on distance between the tape node and the area or a time before the tape node enters the area. In one example of block 1915, the tape node establishes the connection a mile or two miles before entering the area. In one example of block 1915, the tape node establishes the connection a minute or 5 seconds before entering the area.

Figure 20:
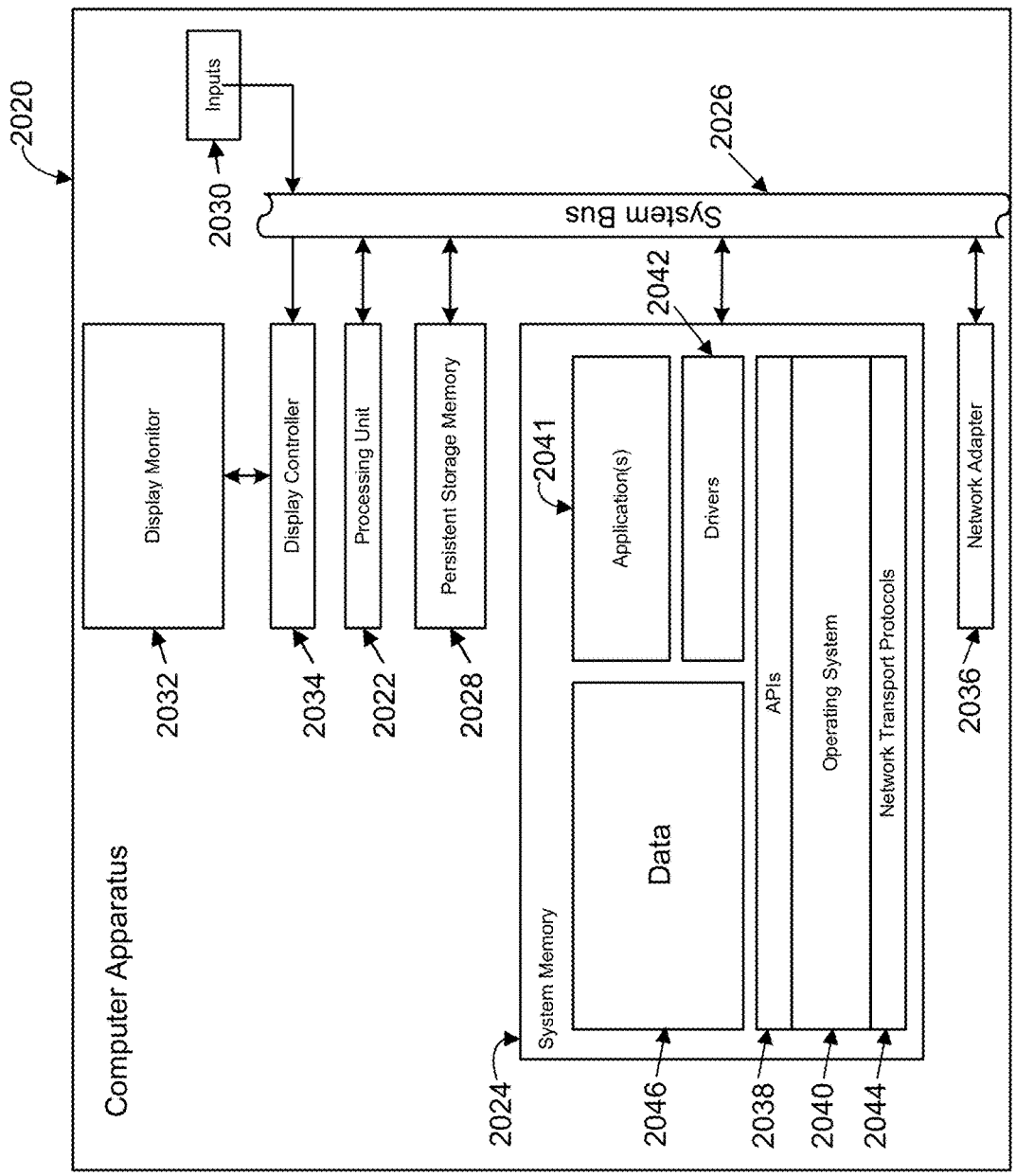
FIG. 20 is a block diagram of example computer apparatus, according to an embodiment.

FIG. 20 shows an example embodiment of computer apparatus 2020 that, either alone or in combination with one or more other computing apparatus, is operable to implement one or more of the computer systems described in this specification. The computer apparatus 2020 includes a processing unit 2022, a system memory 2024, and a system bus 2026 that couples the processing unit 2022 to the various components of the computer apparatus 2020. The processing unit 2022 may include one or more data processors, each of which may be in the form of any one of various commercially available computer processors. The system memory 2024 includes one or more computer-readable media that typically are associated with a software application addressing space that defines the addresses that are available to software applications. The system memory 2024 may include a read only memory (ROM) that stores a basic input/output system (BIOS) that contains start-up routines for the computer apparatus 2020, and a random-access memory (RAM). The system bus 2026 may be a memory bus, a peripheral bus, or a local bus, and may be compatible with any of a variety of bus protocols, including PCI, VESA, Microchannel, ISA, and EISA. The computer apparatus 2020 also includes a persistent storage memory 2028 (e.g., a hard drive, a floppy drive, a CD ROM drive, magnetic tape drives, flash memory devices, and digital video disks) that is connected to the system bus 2026 and contains one or more computer-readable media disks that provide non-volatile or persistent storage for data, data structures and computer-executable instructions.

A user may interact (e.g., input commands or data) with the computer apparatus 2020 using one or more input devices 2030 (e.g. one or more keyboards, computer mice, microphones, cameras, joysticks, physical motion sensors, and touch pads). Information may be presented through a graphical user interface (GUI) that is presented to the user on a display monitor 2032, which is controlled by a display controller 2034. The computer apparatus 2020 also may include other input/output hardware (e.g., peripheral output devices, such as speakers and a printer). The computer apparatus 2020 connects to other network nodes through a network adapter 2036 (also referred to as a "network interface card" or NIC).

A number of program modules may be stored in the system memory 2024, including application programming interfaces 2038 (APIs), an operating system (OS) 2040 (e.g., the Windows® operating system available from Microsoft Corporation of Redmond, Washington U.S.A.), software applications 2041 including one or more software applications programming the computer apparatus 2020 to perform one or more of the steps, tasks, operations, or processes of the positioning and/or tracking systems described herein, drivers 2042 (e.g., a GUI driver), network transport protocols 2044, and data 2046 (e.g., input data, output data, program data, a registry, and configuration settings).

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A wireless sensing system comprising at least one tape node, each tape node adhered to a respective asset, comprising at least one sensor, the at least one tape node having a first processor, a first memory communicatively coupled with the first processor, the first memory storing machine-readable instructions that, when executed by the first processor, cause the first processor to:
    capture, by the at least one sensor of the at least one tape node, environmental data;
    generate, based on the captured environmental data, at least one environmental profile;
    determine, based on comparing the environmental profile to an accepted environmental profile, that a difference between the environmental profile and an accepted environmental profile satisfies a predetermined threshold;
    determine, based on the difference satisfying the threshold, that the respective asset is at risk
    generate a notification that includes instructions to perform an action,
    wirelessly transmit the notification to another node of the wireless sensing system, and prioritize transmitting the notification over conserving a battery life of the at least one tape node.

2. The system of claim 1, wherein the instructions to perform an action include instructions to perform one of: prioritizing loading of the respective asset, prioritizing unloading of the respective asset, and prioritizing transport of the respective asset to a location other than a current location of the asset.

3. The system of claim 1, wherein the determining the difference satisfies the predetermined threshold is based on one or more machine learning algorithms trained on data sets of historic environmental profiles.

4. The system of claim 1, the first memory storing further machine-readable instructions that, when executed by the first processor, further causes the first processor to transmit the notification to a gateway device of the wireless sensing system.

5. The system of claim 1, wherein the notification is an urgent alert to take urgent action, the first memory storing further machine-readable instructions that, when executed by the first processor, further causes the first processor to:
    transmit the notification to a smart device of the wireless sensing system to generate an urgent alarm in a form of an audio or visual alert.

6. The system of claim 1, the first memory storing further machine-readable instructions that, when executed by the first processor, further causes the first processor to transmit the notification to a client device of the wireless sensing system for display within a graphical user interface of the client device.

7. The system of claim 1, wherein the notification to perform the action includes a schedule for delivering the respective asset.

8. The system of claim 1, wherein the action includes marking the asset as undeliverable.

9. The system of claim 1, wherein the action includes unloading the asset from a delivery vehicle.

10. The system of claim 1, wherein the generated notification is transmitted directly to a user client device via wireless communication.

11. The wireless sensing system of claim 1, wherein the machine-readable instructions, when executed by the first processor, further cause the processor to: increase a rate of wireless transmission, in response to determining that the respective asset is at risk.

12. The wireless sensing system of claim 1, wherein the machine-readable instructions, when executed by the first processor, further cause the processor to: switch to a second wireless communication protocol from a first wireless communication protocol, in response to determining that the respective asset is at risk.

13. A wireless sensing system comprising at least one tape node, each tape node adhered to a respective asset, comprising: at least one sensor, a first processor, and a first memory communicatively coupled with the first processor, the first memory storing machine-readable instructions that, when executed by the first processor, cause the first processor to:
capture, by the at least one sensor of the at least one tape node, environmental data;
generate, based on the captured environmental data, at least one environmental profile;
determine, based on comparing the environmental profile to an accepted environmental profile, that a difference between the environmental profile and an accepted environmental profile satisfies a predetermined threshold;
determine, based on the difference satisfying the predetermined threshold, that the respective asset should be prioritized for loading or unloading,
generate a notification for a user of the wireless sensing system that includes instructions to perform an action corresponding to the prioritized loading or unloading, and
transmit the generated notification to another node of the wireless sensing system;
wherein a delivery order for a group of assets is reordered, in response to the other node receiving the notification, the group of assets including the respective asset.

14. The wireless sensing system of claim 13, wherein each tape node further comprises at least a first type of wireless communication interface.

15. The wireless sensing system of claim 14, wherein the generated notification is transmitted directly to a user client device using the first type of wireless communication interface.

16. The wireless sensing system of claim 15, wherein the first type of wireless communication interface is a Bluetooth-based communication interface.

17. A wireless sensing system comprising:
a plurality of tape nodes, each tape node adhered to a respective asset and comprising:
at least one sensor,
a first processor, and
a first memory communicatively coupled with the first processor, the first memory storing machine-readable instructions that, when executed by the first processor, cause the first processor to:
capture, by the at least one sensor of the at least one tape node, environmental data;
generate, based on the captured environmental data, at least one environmental profile;
determine, based on comparing the environmental profile to an accepted environmental profile, that a difference between the environmental profile and an accepted environmental profile satisfies a predetermined threshold;
determine, based on the difference satisfying the predetermined threshold, that the respective asset should be prioritized for loading or unloading,
and generate a notification for a user of the wireless sensing system that includes instructions to perform an action corresponding to the prioritized loading or unloading, and
wirelessly transmit the generated notification directly to a user client device; and
the user client device configured to:
wirelessly communicate with the plurality of tape nodes, receive the generated notifications from each of the plurality of tape nodes, and display, on a display of the user client device, information on each of the tape nodes, the information comprising data in the received notifications, and
reorder a delivery order for a group of assets, in response to receiving the generated notifications from each of the plurality of tape nodes.

18. The wireless sensing system of claim 17, wherein the user client device displays a priority for each of the plurality of tape nodes relative to the other tape nodes of the plurality of tape nodes, based on data in the received notifications.

19. The wireless sensing system of claim 17, wherein the user client device is operable to display a map of an area with an indicator of a location within the area for at least one of the plurality of tape nodes.

* * * * *